(12) United States Patent
Jung et al.

(10) Patent No.: US 12,386,498 B2
(45) Date of Patent: Aug. 12, 2025

(54) METHOD FOR PROVIDING CAPTURE FUNCTION AND ELECTRONIC DEVICE THEREFOR

(71) Applicant: Samsung Electronics Co., Ltd., Suwon-si (KR)

(72) Inventors: Inhyung Jung, Suwon-si (KR); Banghyun Kwon, Suwon-si (KR); Hyunwoong Kwon, Suwon-si (KR); Sangheon Kim, Suwon-si (KR); Yeunwook Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/162,266

(22) Filed: Jan. 31, 2023

(65) Prior Publication Data

US 2023/0185442 A1    Jun. 15, 2023

Related U.S. Application Data

(63) Continuation of application No. PCT/KR2021/010289, filed on Aug. 4, 2021.

(30) Foreign Application Priority Data

Aug. 4, 2020  (KR) .................. 10-2020-0097118

(51) Int. Cl.
*G06F 3/048* (2013.01)
*G06F 3/0481* (2022.01)
(Continued)

(52) U.S. Cl.
CPC .......... *G06F 3/0486* (2013.01); *G06F 3/0481* (2013.01); *G06F 3/04845* (2013.01); *G06F 2203/04803* (2013.01)

(58) Field of Classification Search
CPC .. G06F 3/0486; G06F 3/0481; G06F 3/04845; G06F 2203/04803; G06F 1/1616;
(Continued)

(56) References Cited

U.S. PATENT DOCUMENTS 7,430,497 B2    9/2008   Wang et al.
7,966,558 B2    6/2011   Duncan et al.
(Continued)

FOREIGN PATENT DOCUMENTS

CN    103593120 A  *  2/2014
CN    104461474 A  *  3/2015  ......... G06F 16/5854
(Continued)

OTHER PUBLICATIONS

International Search Report dated Oct. 29, 2021, issued in International Patent Application No. PCT/KR2021/010289.
(Continued)

*Primary Examiner* — Rashawn N Tillery
(74) *Attorney, Agent, or Firm* — Jefferson IP Law, LLP

(57) ABSTRACT

An electronic device having a screen capture function and a method for operating a screen capture function on the electronic device are provided. An electronic device includes a display module and a processor, wherein the processor may display execution screens that correspond respectively to a plurality of applications, based on a multi-window, detect an interaction related to a screen capture while the respective execution screens are displayed through the multi-window, based on the interaction, perform a screen capture for each window based on an area of interest for each window of the multi-window, provide a cue including at least a portion of the area of interest for each window based on the screen capture, and process an event using capture data corresponding to the cue, based on a user input using the cue.

21 Claims, 23 Drawing Sheets

(51) Int. Cl.
*G06F 3/04845* (2022.01)
*G06F 3/0486* (2013.01)

(58) Field of Classification Search
CPC ...... G06F 1/1624; G06F 1/1671; G06F 3/017; G06F 3/03545; G06F 3/04842; G06F 3/04883; G06F 3/04886; G06F 3/0484; G06T 7/11; G06T 1/0007; H04N 23/631; H04N 23/64
See application file for complete search history.

(56) References Cited

U.S. PATENT DOCUMENTS

| | | | |
|---|---|---|---|
| 9,395,945 B2* | 7/2016 | de Paz | G06F 1/1681 |
| 9,471,219 B2 | 10/2016 | Jang et al. | |
| 10,055,563 B2 | 8/2018 | Huang et al. | |
| 10,088,991 B2 | 10/2018 | Kim et al. | |
| 10,244,369 B1* | 3/2019 | Sharifi | G06F 16/583 |
| 11,055,053 B2 | 7/2021 | Mori et al. | |
| 11,669,242 B2* | 6/2023 | Xiong | G06F 3/0481 |
| | | | 715/700 |
| 2007/0234212 A1 | 10/2007 | De Souza et al. | |
| 2010/0162153 A1* | 6/2010 | Lau | H04M 3/563 |
| | | | 715/810 |
| 2010/0171712 A1 | 7/2010 | Cieplinski et al. | |
| 2013/0225236 A1* | 8/2013 | Lee | G06F 16/58 |
| | | | 455/556.1 |
| 2013/0227457 A1 | 8/2013 | Kim et al. | |
| 2014/0013258 A1 | 1/2014 | Jang et al. | |
| 2014/0164957 A1* | 6/2014 | Shin | G06F 3/04817 |
| | | | 715/806 |
| 2014/0189576 A1* | 7/2014 | Carmi | G06V 10/757 |
| | | | 715/781 |
| 2015/0278180 A1* | 10/2015 | Nicholas, Jr. | G06F 3/04883 |
| | | | 715/230 |
| 2015/0346968 A1 | 12/2015 | Johnson et al. | |
| 2016/0274771 A1* | 9/2016 | Seong | G06F 16/5866 |
| 2016/0283089 A1 | 9/2016 | Han et al. | |
| 2016/0283204 A1* | 9/2016 | Zaiwei | G06F 3/033 |
| 2016/0378292 A1 | 12/2016 | Lu et al. | |
| 2017/0083182 A1* | 3/2017 | Singh | G06F 3/0482 |
| 2018/0046341 A1* | 2/2018 | Lee | G06F 3/0883 |
| 2018/0203597 A1 | 7/2018 | Lee et al. | |
| 2020/0159370 A1* | 5/2020 | Lees | G06F 16/957 |
| 2021/0064394 A1* | 3/2021 | Shu | G06T 3/40 |
| 2021/0269656 A1 | 9/2021 | Lai et al. | |
| 2022/0036464 A1* | 2/2022 | Brandmaier | H04N 23/80 |
| 2022/0124057 A1* | 4/2022 | Kulkarni | H04L 51/046 |
| 2022/0206677 A1* | 6/2022 | Zadina | G06F 16/9535 |
| 2022/0214802 A1* | 7/2022 | Xiong | G06F 3/04886 |
| 2022/0317824 A1* | 10/2022 | Lee | G06T 7/11 |
| 2022/0334697 A1* | 10/2022 | Xu | G06F 3/04886 |
| 2023/0418446 A1* | 12/2023 | Peng | G06F 3/0488 |

FOREIGN PATENT DOCUMENTS

| | | | | |
|---|---|---|---|---|
| CN | 104484061 A | | 4/2015 | |
| CN | 103544021 B | * | 10/2017 | |
| CN | 107526525 A | * | 12/2017 | ......... G06F 3/04883 |
| CN | 110231905 A | | 9/2019 | |
| CN | 110737386 A | | 1/2020 | |
| CN | 107102786 B | * | 6/2020 | ......... G06F 16/5838 |
| EP | 2648087 A2 | | 10/2013 | |
| EP | 2741192 A2 | * | 6/2014 | ............ G06F 3/041 |
| JP | 4350137 B2 | | 10/2009 | |
| KR | 10-2016-0059355 A | | 5/2016 | |
| KR | 10-1984673 B1 | | 5/2019 | |
| KR | 10-2019-0126267 A | | 11/2019 | |
| KR | 10-2022-0016727 A | | 2/2022 | |
| WO | 2020/006359 A1 | | 1/2020 | |

OTHER PUBLICATIONS

European Search Report dated Dec. 12, 2023, issued in European Application No. 21853639.9.
European Office Action dated Jan. 22, 2025, issued in a European Patent Application No. 21853639.9-1218.

* cited by examiner

METHOD FOR PROVIDING CAPTURE FUNCTION AND ELECTRONIC DEVICE THEREFOR

CROSS-REFERENCE TO RELATED APPLICATION(S)

This application is a continuation application, claiming priority under § 365(c), of an International application No. PCT/KR2021/010289, filed on Aug. 4, 2021, which is based on and claims the benefit of a Korean patent application number 10-2020-0097118, filed on Aug. 4, 2020, in the Korean Intellectual Property Office, the disclosure of which is incorporated by reference herein in its entirety.

BACKGROUND

1. Field

The disclosure relates to an electronic device having a screen capture function and a method for operating a screen capture function on the electronic device.

2. Description of Related Art

With the development of digital technologies, various types of electronic devices such as mobile communication terminals, personal digital assistants (PDAs), electronic notebooks, smartphones, tablet personal computers (PCs), and wearable devices. Hardware components and/or software components of the electronic device are consistently improved to support and improve the function of the electronic device.

For example, the electronic device provides a screen capture (or screenshot) function capable of capturing an execution screen being displayed on a display. For example, the screen capture (or screenshot) function captures the execution screen being displayed on the display as it looks and store a digital image. For example, the screen capture function outputs and store the entire screen as a general bitmap image (e.g., bitmap (BMP), portable network graphics (PNG), or joint photographic experts group (JPEG)) file or output and store screens for a predetermined period of time as a video file.

The above information is presented as background information only to assist with an understanding of the disclosure. No determination has been made, and no assertion is made, as to whether any of the above might be applicable as prior art with regard to the disclosure.

SUMMARY

Currently, the electronic device provides a multi-window on a single display or includes at least two displays so that the at least two displays are used to provide a single window or a multi-window. However, in the case of the screen capture function, only the entire screen displayed on the display is captured without dividing the multi-window (or the region).

Aspects of the disclosure are to address at least the above-mentioned problems and/or disadvantages and to provide at least the advantages described below. Accordingly, an aspect of the disclosure is to provide a method and device for supporting a screen capture for each window in a multi-window environment of an electronic device.

Another aspect of the disclosure is to provide a method and device capable of capturing a screen corresponding to each of multiple windows based on a screen capture interaction in a multi-window environment and providing a cue related to a capturing result (e.g., capture data) corresponding to each of the multiple windows.

Additional aspects will be set forth in part in the description which follows and, in part, will be apparent from the description, or may be learned by practice of the presented embodiments.

In accordance with an aspect of the disclosure, an electronic device is provided. The electronic device includes a display module, and at least one processor operatively connected to the display module, in which the at least one processor is configured to display execution screens respectively corresponding to a plurality of applications based on a multi-window, detect an interaction related to a screen capture while displaying the respective execution screens of the plurality of executions screens through the multi-window, perform the screen capture for each window based on a region of interest for each window of the multi-window based on the interaction, provide a cue including at least a part of the region of interest for each window based on the screen capture, and process an event using capture data corresponding to the cue based on a user input using the cue.

In accordance with another aspect of the disclosure, a method of operating an electronic device is provided. The method includes an operation of displaying a plurality of execution screens respectively corresponding to a plurality of applications based on a multi-window, an operation of detecting an interaction related to a screen capture while displaying the respective execution screens of the plurality of execution screens through the multi-window, an operation of performing the screen capture for each window based on a region of interest for each window of the multi-window based on the interaction, an operation of providing a cue including at least a part of the region of interest for each window based on the screen capture, and an operation of processing the event using capture data corresponding to the cue based on a user input using the cue.

To solve the above-mentioned problem, various embodiments of the disclosure may include a computer-readable recording medium in which a program executed by a processor is recorded.

An additional range of the applicability of the disclosure will become apparent from the following detailed description. However, various alterations and modifications may be clearly understood by those skilled in the art without departing from the spirit and scope of the disclosure. Accordingly, it should be understood that the detailed description and the specific embodiments such as the embodiments of the disclosure are just provided for illustrative purposes.

According to the electronic device and the method of operating the same according to various embodiments, the screen capture distinguishable for each window of the multi-window is provided in addition to the screen capture (or the screenshot) of the entire screen in the multi-window environment, which makes it possible to improve the user's experience in respect to the screen capture function. According to various embodiments, various interactions for operating the screen capture in the multi-window environment of the electronic device is provided, which makes it possible to improve usability. According to various embodiments, quick screen capture and sharing functions are provided for each window in the multi-window environment of the electronic device, which makes it possible to improve usability.

In addition, various effects that can be directly or indirectly identified through the document may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
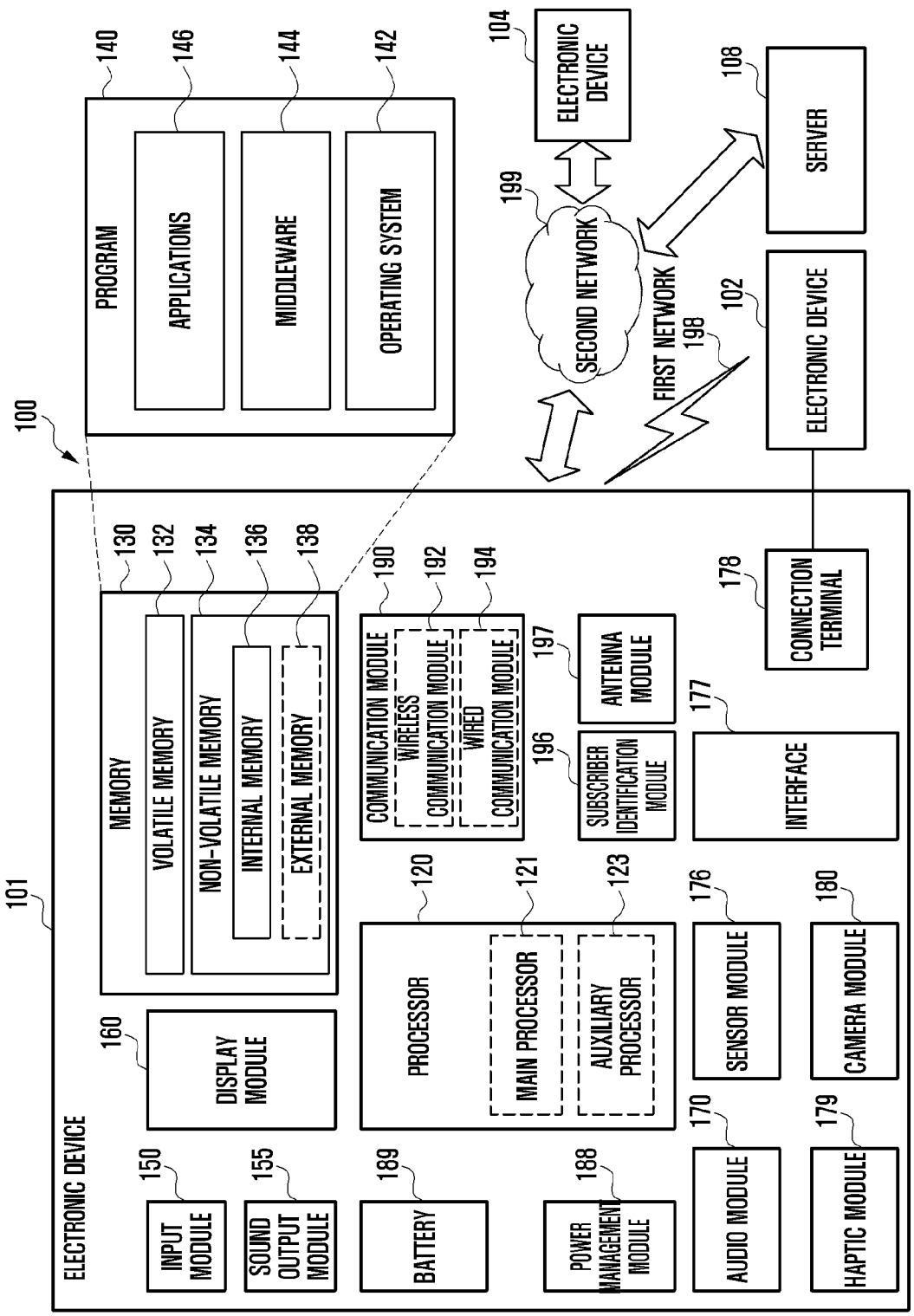
FIG. 1 is a block diagram illustrating an example electronic device in a network environment according to an embodiment of the disclosure.

FIG. 1 is a block diagram illustrating an example electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in another aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
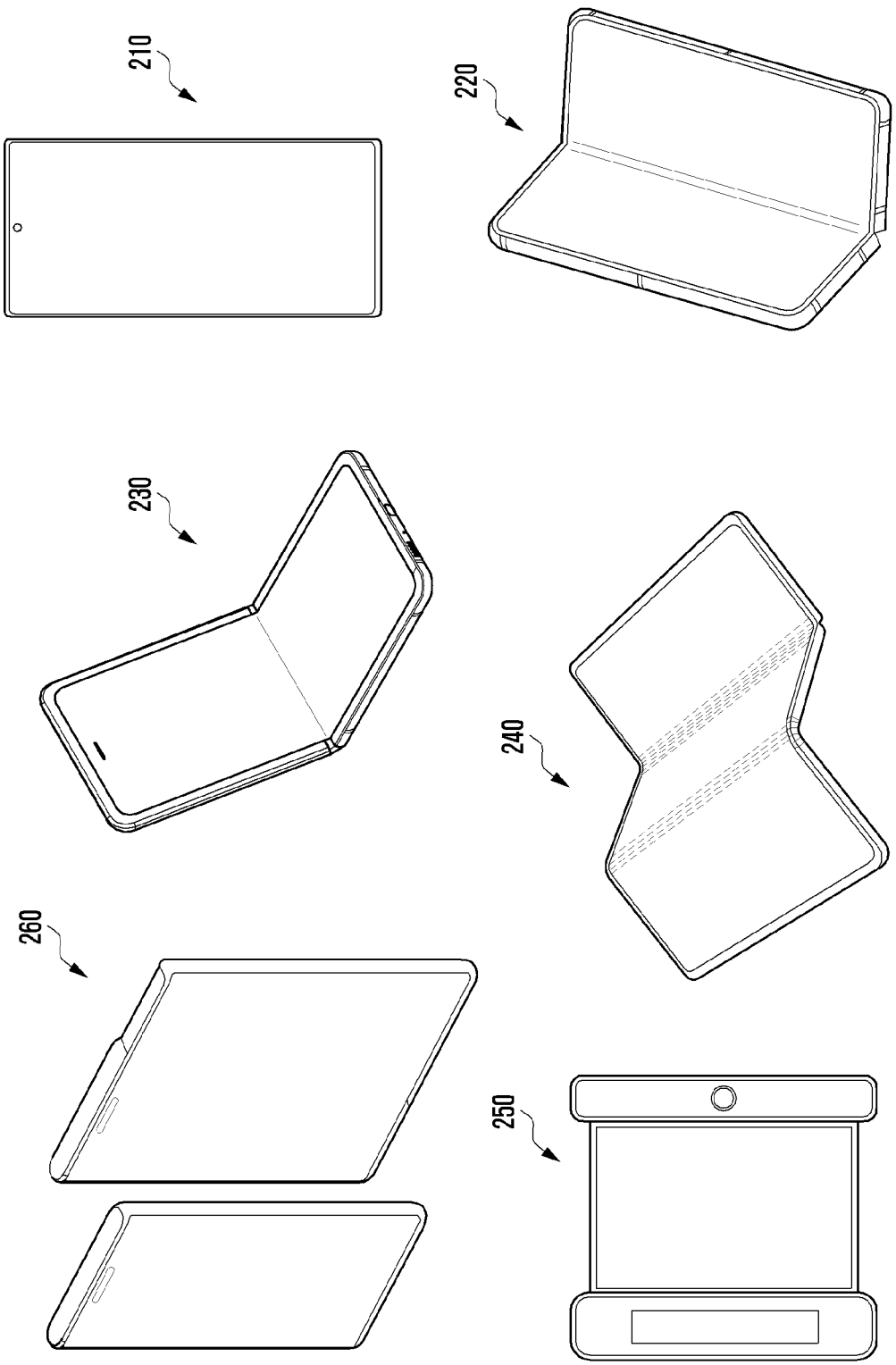
FIG. 2 is a view for explaining an example of an electronic device according to an embodiment of the disclosure.

FIG. 2 is a view for explaining an example of an electronic device according to an embodiment of the disclosure.

Referring to FIG. 2, examples of various form factors of an electronic device 101 in accordance with a display shape according to various embodiments are illustrated. According to the embodiment, the electronic device 101 may include various form factors such as a bar-type or flat plate-type form factor 210, a foldable form factor (i.e., foldable electronic device 220, 230, or 240), a rollable form factor (i.e., a rollable electronic device 250), and/or a slidable form factor (i.e., a slidable electronic device 260). According to the embodiment, the electronic device 101 may be implemented in various shapes. A display (e.g., the display module 160 in FIG. 1) may be provided in various ways in accordance with the implemented shape of the electronic device 101.

The electronic device 101 according to various embodiments disclosed in the document has, but not limited to, a bar-type or flat plate-type external appearance. For example, the illustrated electronic device 101 is a part of a foldable electronic device 220, 230, or 240, a rollable electronic device 250, or a slidable electronic device 260.

According to the embodiment, the foldable electronic device 220, 230, or 240 may mean an electronic device that may be folded in a direction in which two different areas of the display (e.g., the display module 160 in FIG. 1) substantially face each other or are opposite to each other. In general, in a portable state, the display of the foldable electronic device 220, 230, or 240 is folded in a direction in which two different areas face each other or are opposite to each other. In an actual use state, a user may unfold the display (e.g., the display module 160 in FIG. 1) so that the two different areas each have a substantially flat plate shape.

According to the embodiment, the foldable electronic device 220, 230, or 240 may include a form factor (e.g., the foldable electronic device 220 or 230) including two display surfaces (e.g., a first display surface and a second display surface) based on a single folding axis; and/or a form factor (e.g., the foldable electronic device 240) including at least three display surfaces (e.g., a first display surface, a second display surface, and a third display surface) based on at least two folding axes. Various embodiments are not limited thereto but provided for illustrative purposes. The number of folding axes of the electronic device 101 is not limited.

According to the embodiment, the display (e.g., the display module 160 in FIG. 1) of the foldable electronic device 220, 230, or 240 may be folded or unfolded in various ways (e.g., in-folding, out-folding, or in/out folding) in accordance with the implemented shape. According to the embodiment, the foldable electronic device 220, 230, or 240 may include various foldable ways such as a vertically foldable way, a horizontally foldable way, a G foldable way, or a Z foldable way.

According to the embodiment, the slidable electronic device 260 or the rollable electronic device 250 may mean an electronic device in which a display (e.g., the display module 160 in FIG. 1) may be bent, such that at least a part of the display may be wound or rolled or accommodated in a housing (not illustrated). In accordance with the necessity of the user, a screen display area of the slidable electronic device 260 or the rollable electronic device 250 may be expanded and used as the display (e.g., the display module 160 in FIG. 1) is unfolded or a larger area of the display is exposed to the outside.

According to the embodiment, the rollable electronic device 250 may include a form factor including a roll-up-type display (e.g., a rollable display). According to the embodiment, in the slidable electronic device 260 or the rollable electronic device 250, an area of the display, which is exposed to the outside, may vary depending on a degree to which the user unfolds the display (e.g., the display module 160 in FIG. 1).

Although not illustrated in FIG. 2, in some embodiments, the electronic device 101 may include an accommodation space (or an internal space) for accommodating an electronic pen (not illustrated), and the electronic pen may be accommodated in the accommodation space. According to the embodiment, the electronic device 101 may communicate with the electronic pen on the basis of a designated communication method. For example, the electronic device 101 and the electronic pen may communicate with each other through out of band (OOB) (e.g., near field communication (NFC), bluetooth low energy (BLE), and/or Wi-Fi 2.4 gigahertz (GHz)) communication by using a communication circuit.

Figure 3:
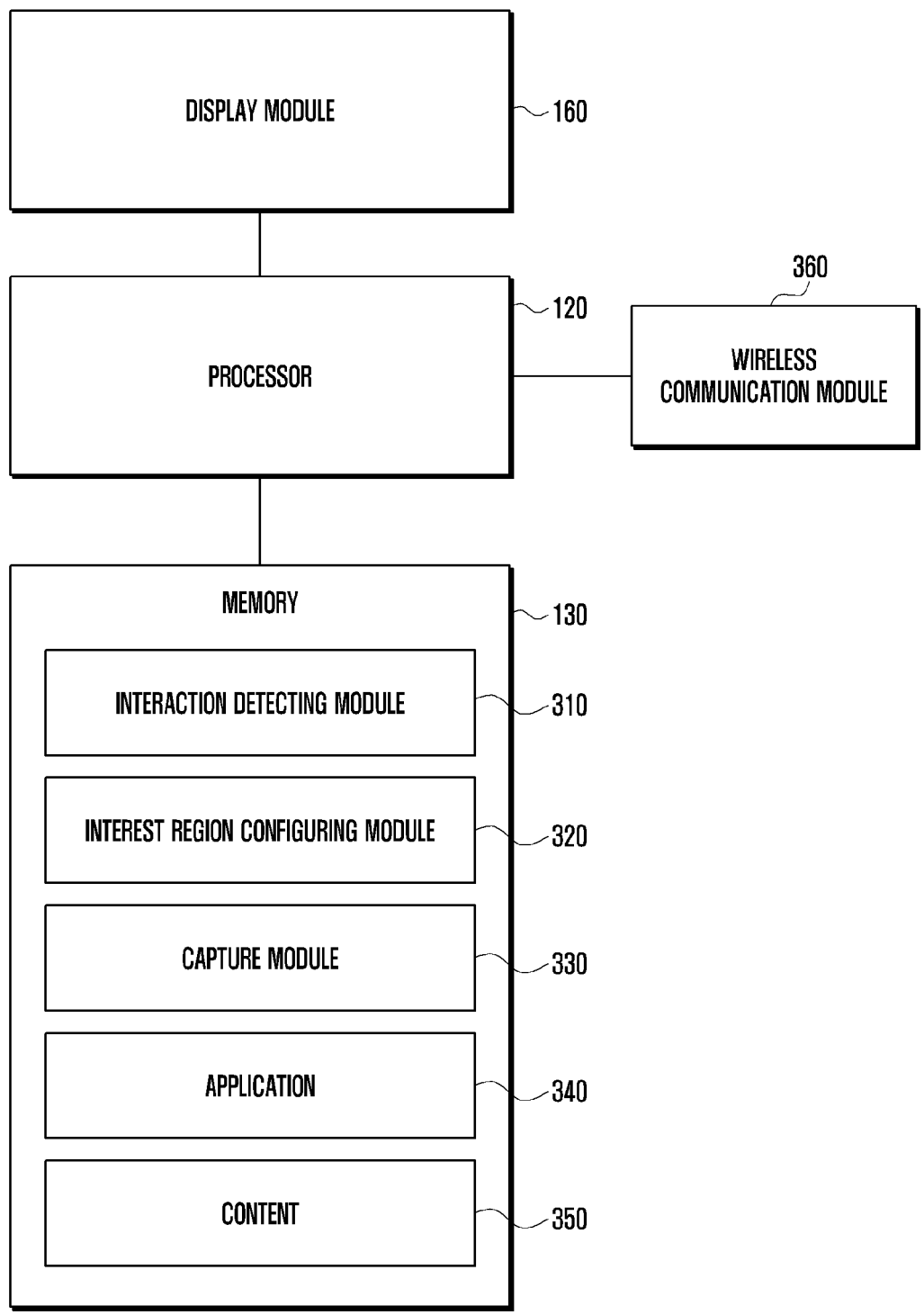
FIG. 3 is a view schematically illustrating a constitution of an electronic device according to an embodiment of the disclosure.

FIG. 3 is a view schematically illustrating a constitution of an electronic device according to an embodiment of the disclosure.

According to the embodiment, FIG. 3 may illustrate an example of a constitution related to an operation of supporting a screen capture (or screenshot) function in the electronic device 101 according to various embodiments. According to the embodiment, the electronic device 101 illustrated in FIG. 3 may include the entirety or at least a part of the constituent element of the electronic device 101 as described in the description described with reference to FIG. 1.

Referring to FIG. 3, the electronic device 101 may include the processor 120, the display module 160, a wireless communication module 360, and the memory 130. According to the embodiment, the constituent elements included in the electronic device 101 may be understood as hardware modules (e.g., circuits (circuitry)), for example. According to the embodiment, the constituent elements included in the electronic device 101 are not limited to the constituent elements (e.g., the processor 120, the display module 160, the wireless communication module 360, and/or the memory 130) illustrated in FIG. 2. For example, the constituent elements of the electronic device 101 illustrated in FIG. 2 are substituted with other constituent elements, or additional constituent elements may be added to the electronic device 101. For example, the electronic device 101 includes other constituent elements such as a sensor module (e.g., the sensor module 176 in FIG. 1), a camera module (e.g., the camera module 180 in FIG. 1), and/or a communication module (e.g., the communication module 190 in FIG. 1).

According to the embodiment, the display module 160 may visually provide information to the outside (e.g., the user) of the electronic device 101. According to the embodiment, the display module 160 may include a touch circuit (or a touch sensor) (not illustrated) or a pressure sensor. The display module 160 may detect a touch input and/or a hovering input (or a proximity input) by measuring a change in signal (e.g., voltage, light amount, resistance, and/or charge quantity) related to a particular position of the display module 160 on the basis of the touch circuit or the pressure sensor. According to some embodiments, the display module 160 may be coupled to or disposed adjacent to a digitizer circuit that detects the electronic pen (not illustrated). According to the embodiment, the display module 160 may be constituted as a liquid crystal display (LCD) device, an organic light-emitting diode (OLED), an active matrix organic light-emitting diode (AMOLED), or a flexible display.

According to the embodiment, the display module 160 may visually provide various information (e.g., capture layouts), regions of interest (ROI) objects, and/or cue objects (e.g., thumbnail objects) related to the screen capture executed by the user under the control of the processor 120. For example, the display module 160 displays an execution screen (e.g., including a home screen) of an application 340, content 350 stored in the memory 130, or relevant information corresponding to the screen capture on the execution screen of the application 340.

According to the embodiment, the wireless communication module 360 (e.g., the wireless communication module 192 in FIG. 1) may support a legacy network (e.g., a third generation (3G) network and/or a 4G network), a 5G network, an out of band (OOB), and/or a next-generation communication technology (e.g., new radio (NR) technology). The wireless communication module 360 according to the embodiment may include a first communication circuit configured to support wireless communication of the electronic device 101 through a first network (e.g., a cellular network); and a second communication circuit configured to support wireless communication of the electronic device 101 on the basis of the out of band (OOB) (e.g., NFC, BLE, and/or wireless fidelity (Wi-Fi) 2.4 GHz). According to the embodiment, the electronic device 101 may communicate with an external device and/or a server through a designated network by using the first communication circuit. According to the embodiment, the electronic device 101 may communicate with the electronic pen (not illustrated) through a second network (e.g., a short distance communication network such as Bluetooth, BLE, Wi-Fi direct, or infrared data association (IrDA)) different from the first network by using the second communication circuit.

According to the embodiment, the electronic device 101 may receive information (e.g., an air command) related to an air action (or an air gesture) from the electronic pen in a state in which the electronic device 101 is connected to the electronic pen in a communication manner through the wireless communication module 360. According to the embodiment, the air action may be a function capable of remotely controlling the electronic device 101 by using the electronic pen. For example, the air action includes an operation of executing a designated action (or a gesture) in the air in a state in which the user pushes a button included in the electronic pen. The electronic pen may transfer information (e.g., the air command) related to the user's air action to the electronic device 101 through OOB communication.

According to the embodiment, the electronic device 101 may execute a function (e.g., a screen capture function) corresponding to an input signal (e.g., an air action) of the electronic pen and display a user interface (UI) through the display module 160. The operation of mapping the function related to the air action of the electronic pen according to the embodiment will be described with reference to the drawings described below.

According to the embodiment, the memory 130 may store various data to be used by at least one constituent element (e.g., the processor 120) of the electronic device 101. For example, the data includes the application 340 (e.g., the application 146 in FIG. 1) and/or the content 350.

In the embodiment, the application 340 various applications that may be executed by the electronic device 101. For example, the application 340 includes home, dialer, short message service (SMS)/multimedia messaging service (MMS), instant message (IM), browser, camera, alarm, contact, voice recognition, email, calendar, media player, album, watch, health (e.g., measurement of momentum or biometric information such as blood glucose), or environmental information (e.g., measurement of information on atmospheric pressure (air pressure), humidity, or temperature) applications. The type of application may not be limited. According to the embodiment, the application 340 may further include an information exchange application that may support information exchange between the electronic device 101 and an external electronic device. For example, the information exchange application includes a notification relay application configured to transfer designated information (e.g., telephone, message, or alarm) to the external electronic device; or a device management application configured to manage the external electronic device.

In the embodiment, the content 350 may include the user's content created by using the application 340 (e.g., an image or video captured by the user). For example, the content 350 includes input data and/or output data associated with instructions related to the application 340. According to the embodiment, the application 340 and/or the content 350 may be stored as software (e.g., the program 140 in FIG. 1) in the memory 130 and executed by the processor 120.

According to the embodiment, the memory 130 may include an interaction detecting module 310 (or an interaction detecting means), an interest region configuring module 320 (or an interest region configuration means), and/or a capture module 330 (or a capture means) that are related to the function (e.g., a screen capture function) that may be executed by the processor 120. According to the embodiment, the functions of the interaction detecting module 310, the interest region configuring module 320, and/or the capture module 330, which are executed by the processor 120, may be implemented in the form of instructions and stored in the memory 130. For example, the interaction detecting module 310, the interest region configuring module 320, and/or the capture module 330 are understood as hardware modules (e.g., circuits (circuitry)), but various embodiments are not limited thereto. For example, the interaction detecting module 310, the interest region configuring module 320, and/or the capture module 330 additionally or approximately include software structures as well as hardware structures. According to the embodiment, the interaction detecting module 310, the interest region configuring module 320, and/or the capture module 330 may be implemented as software (e.g., the program 140 in FIG. 1) including one or more instructions stored in a storage medium (e.g., the memory 130) readable by the processor 120. According to the embodiment, the operations, which are performed by the interaction detecting module 310, the interest region configuring module 320, and/or the capture module 330, may be stored in the memory 130. The operations may be executed by the instructions that allow the processor 120 to operate.

According to the embodiment, the interaction detecting module 310 may detect an interaction related to the screen capture. According to the embodiment, the interaction detecting module 310 may receive an interaction designated to execute the screen capture from the user while displaying a plurality of execution screens corresponding to the applications through the multi-window. According to the embodiment, the designated interactions may include a capture interaction using a hardware button of the electronic device 101, a capture interaction using the user's gesture (e.g., a hand gesture), a capture interaction using voice (e.g., Bixby), a capture interaction using the electronic pen, and/or a capture interaction using a software button of an edge panel. An interaction detecting operation according to the embodiment will be described below in detail with reference to the drawings.

According to the embodiment, the interest region configuring module 320 may provide (e.g., display) a cue including a region of interest of the application. According to the embodiment, the interest region configuring module 320 may configure the region of interest of the corresponding application for each window in case that the screen capture is executed while the multi-window operates. For example, on the assumption of a two-split multi-window, the interest region configuring module 320 configures a first region of interest on the basis of an execution screen of a first application in a first window of the two-split multi-window and configure a second region of interest on the basis of an execution screen of a second application in a second window. The operation of configuring the region of interest according to the embodiment will be described in detail with reference to the drawings described below.

According to the embodiment, the capture module 330 may process the screen capture on the basis of the interaction. According to the embodiment, the capture module 330 may create first capture data corresponding to the first region of interest in the first window and second capture data corresponding to the second region of interest in the second window. According to the embodiment, the capture module 330 may create and provide a first cue object corresponding to the first capture data and a second cue object corresponding to the second capture data. For example, the capture module 330 creates (e.g., capture) an image (or capture data) corresponding to the entirety or a part of the region of interest and create a cue object (e.g., a floating icon) having a designated shape (e.g., a circular, quadrangular, or elliptical shape) by adjusting a size of (e.g., downsizing) the created image. The capture operation according to the embodiment will be described in detail with reference to the drawings described below.

According to the embodiment, the processor 120 may execute the application 340 in the electronic device 101 and store the content 350, which is created by the application 340, in the memory 130. According to the embodiment, the processor 120 may control the display module 160 to capture the entirety or a part of the execution screen of the application 340, on the basis of the interaction related to the screen capture, while displaying the execution screen of the application 340 through the display module 160 and to display an information object (e.g., a cue object), which is related to capture, on the execution screen. The interaction related to the screen capture according to the embodiment will be described with reference to the drawings described below.

According to the embodiment, the processor 120 may create one or more capture data on the basis of a screen split (or multi-window) state of the display module 160 and temporarily store the capture data in the memory 130. According to the embodiment, the processor 120 may create and display an information object related to one or more types of capture on the basis of the temporarily stored temporary capture data. According to the embodiment, the processor 120 may store the capture data (e.g., the content 350) in the memory 130 on the basis of the information object selected by the user on the basis of the information object and remove the temporary capture data, which are related to other (or remaining) information objects that are not selected, from the memory 130.

According to the embodiment, the processor 120 may include constituent elements corresponding to the interaction detecting module 310, the interest region configuring module 320, and/or the capture module 330 that are stored in the form of instructions in the memory 130.

Figure 4:
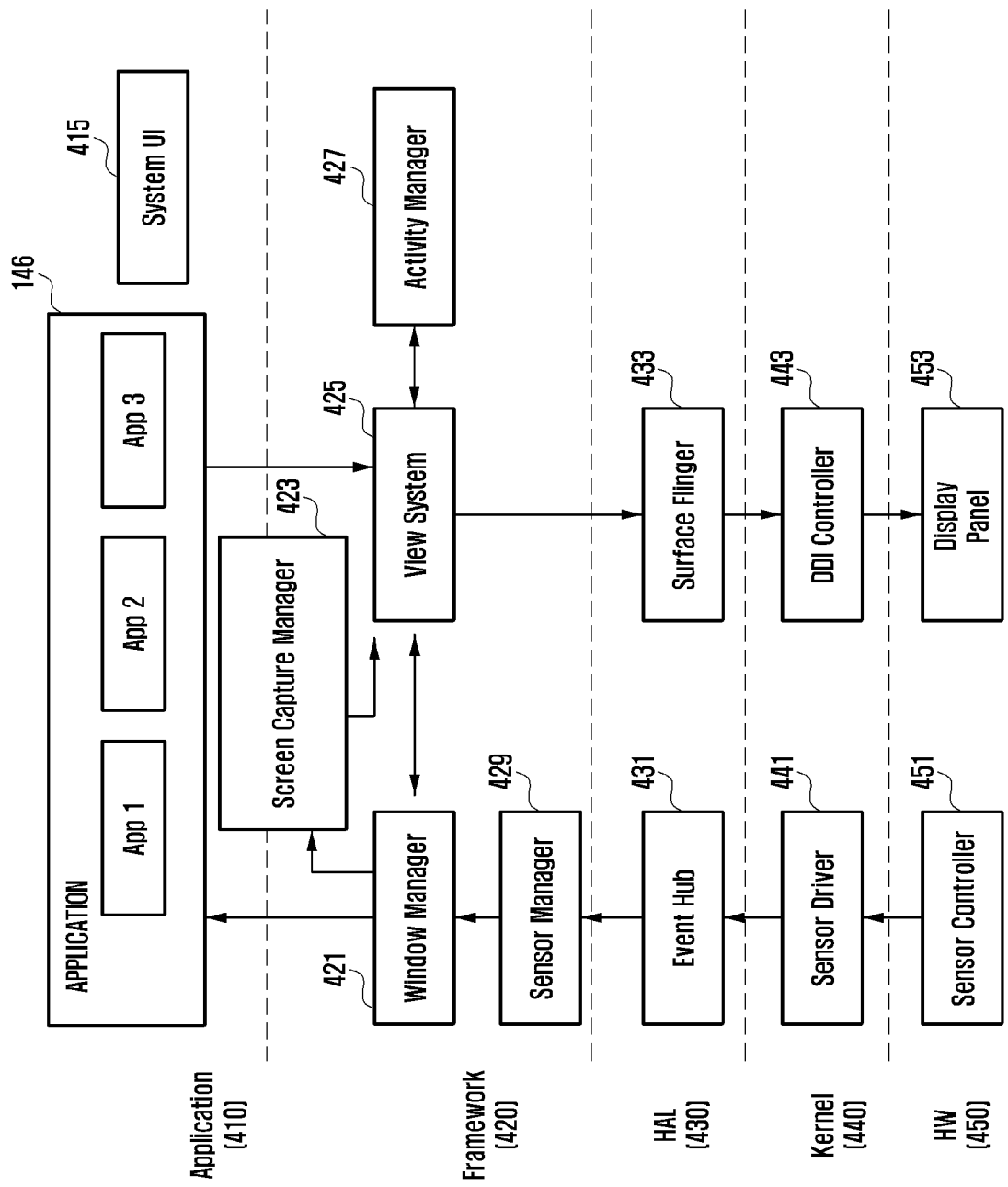
FIG. 4 is a view illustrating an example of a structure of a platform architecture of an electronic device according to an embodiment of the disclosure.

FIG. 4 is a view illustrating an example of a structure of a platform architecture of an electronic device according to an embodiment of the disclosure.

Referring to FIG. 4, the electronic device 101 according to various embodiments may process and manage the screen capture function on the basis of the structure of the platform architecture as illustrated in FIG. 4. According to the embodiment, the platform architecture of the electronic device 101 illustrated in FIG. 4 may be executed by the processor 120 and loaded into the memory 130, such that the platform architecture may be implemented in a software manner. For example, the constitution of the electronic device 101, which is implemented in a software manner, is divided into an application layer 410 (e.g., the application 146 in FIG. 1), a framework layer 420 (e.g., the middleware 144 in FIG. 1), a hardware abstraction layer 430 (HAL), a kernel layer 440, and a hardware (HW) layer 450. According to the embodiment, at least some of the constitutions illustrated in FIG. 4 may vary depending on the platform included in the electronic device 101. For example, at least some of the platform architectures may be pre-loaded into the electronic device 101 during the manufacturing process or updated or downloaded from the external electronic device (e.g., the electronic device 102 or 104 or the server 108 in FIG. 1) when being used by the user.

According to the embodiment, the application layer 410 may include an application (e.g., the application 146 in FIG. 1) and a system user interface (system UI). The application 146 may include, but not limited to, applications, e.g., App 1, App 2, and App 3 stored in the memory 130 of the electronic device 101, executable by the processor 120, or installed in the processor 120. For example, App 1 is an air action application, i.e., an application that provides an interaction with the user to configure the air action using the electronic pen. The system user interface 415 may be a system of the electronic device 101, e.g., an application that controls displaying of a common area (fixed area/part) or a common function of the screen. For example, the system user interface 415 manages a screen related to a notification bar and a quick view.

According to the embodiment, the framework layer 420 (e.g., the middleware 144 in FIG. 1) may provide various functions to the application 146 so that the function or information provided from one or more resources of the electronic device 101 may be used by the application 146. For example, the framework layer 420 includes, but not limited to, a window manager 421, a screen capture manager 423, a view system 425, an activity manager 427, and a sensor manager 429. For example, the framework layer 420 further includes various managers such as an application manager, a multimedia manager, a resource manager, a power manager, a database manager, a package manager, a connectivity manager, a notification manager, a location manager, a graphic manager, a security manager, a telephony manager, and/or a voice recognition manager that are not illustrated.

For example, the window manager 421 manages one or more GUI (graphical user interface) resources used for the screen. For example, the window manager 421 transfers information on a display area of the electronic device 101 to the application 146. According to some embodiments, when a change in state of the electronic device 101 is identified by the sensor module (e.g., the sensor module 176 in FIG. 1), the window manager 421 may transfer information on the display area, which corresponds to the changed state of the electronic device 101, to the application 146. For example, when the change in state of the electronic device 101 is identified, the window manager 421 transfers the information on the display area, which corresponds to the changed state of the electronic device 101, to the application that has configured continuity among the applications 146 being executed.

The screen capture manager 423 may manage resources used for the screen capture. According to the embodiment, the screen capture manager 423 may control the screen capture while corresponding to the interaction. According to the embodiment, the screen capture manager 423 may control the screen capture for each window (or area) on the basis of the information on the display area provided by the window manager 421. According to the embodiment, the screen capture manager 423 may transfer the information, which corresponds to the screen capture, to the view system 425.

The view system 425 may include an assembly of expandable views used to create the application user interface. According to the embodiment, the view system 425 may be a program for drawing at least one layer on the basis of resolution of the display area of the display module 160. According to the embodiment, the application 146 may draw at least one layer on the basis of the resolution of the display area of the display module 160 by using the view (e.g., a drawing library).

The activity manager 427 may manage a life cycle of the activity. According to the embodiment, the activity manager 427 may manage the execution and end of the application 146.

The sensor manager 429 may collect and control sensor information on the basis of usability of the sensor module 176.

According to the embodiment, the hardware abstraction layer 430 is an abstracted layer between the software of the electronic device 101 and the plurality of hardware modules (e.g., the display module 160, the sensor module 176, the camera module 180, and/or the communication module 190 in FIG. 1) included in the hardware layer 450. The hardware abstraction layer 430 may include an event hub 431 and a surface flinger 433. The event hub 431 may be an interface made by standardizing an event generated by the touch circuit (e.g., the display module 160) and the sensor circuit (e.g., the sensor module 176). The surface flinger 433 may synthesize a plurality of layers and provide a display controller with data indicating the plurality of synthesized layers. The display controller may mean a graphic display controller.

According to the embodiment, the kernel layer 440 may include various drivers for controlling various hardware modules (e.g., the display module 160, the sensor module 176, the camera module 180, and/or the communication module 190 in FIG. 1) included in the electronic device 101. For example, the kernel layer 440 includes a sensor driver 441 including an interface module configured to control a sensor controller 451 connected to the sensor module 176; and a display controller (display driver IC (DDI)) 453 configured to control a display panel 453 connected to the display module 160.

According to the embodiment, the hardware layer 450 may include, but not limited to, the hardware module or constitution (e.g., the sensor controller 451 and the display panel 453) included in the electronic device 101. The hardware layer 450 may include the constitutions illustrated in FIG. 1.

The electronic device 101 according to various embodiments of the disclosure may include the display module 160, and the processor 120 operatively connected to the display module 160. The processor 120 may display the execution screen corresponding to each of the plurality of applications on the basis of the multi-window, detect the interaction related to the screen capture while displaying the respective execution screens through the multi-window, perform the screen capture for each window on the basis of the region of interest for each window of the multi-window on the basis of the interaction, provide the cue including at least a part of the region of interest for each window on the basis of the screen capture, and process the event using the capture data corresponding to the cue based on the user input using the cue.

According to various embodiments of the disclosure, the processor 120 may receive the interaction designated to execute the screen capture from the user while displaying the plurality of execution screens corresponding to the applications through the multi-window.

According to various embodiments of the disclosure, the designated interaction may include at least one of the capture interaction using the hardware button of the electronic device, the capture interaction using the user's gesture, the capture interaction using voice, the capture interaction using the electronic pen, and/or the capture interaction using the software button of the edge panel.

According to various embodiments of the disclosure, the processor 120 may determine feature information of the application for each window of the multi-window on the basis of the detection of the interaction and identify the region of interest on the basis of the feature information.

According to various embodiments of the disclosure, the feature information of the application may include area information on an area in which a representative image and/or subject is concentrated in the execution screen displayed through the window.

According to various embodiments of the disclosure, the processor 120 may create capture data for each window of the multi-window by capturing the entirety or a part of the region of interest and create the cue object for each window on the basis of the capture data.

According to various embodiments of the disclosure, the processor 120 may create the cue object having a designated shape by adjusting a magnitude of the capture data.

According to various embodiments of the disclosure, the processor 120 may display the cue object so that the cue object overlaps at least one execution screen in a designated area in the display module.

According to various embodiments of the disclosure, the processor 120 may temporarily store the capture data in the memory 130.

According to various embodiments of the disclosure, in case that any one cue is selected from the provided cues, the processor 120 may identify target capture data related to the selected cue, store the target capture data in the memory 130, and remove the temporarily stored capture data, which are related to the cue that is not selected from the provided cues, from the memory 130.

According to various embodiments of the disclosure, the processor 120 may display a graphic effect in which a capture data-based thumbnail image is moved by a movement of a user input related to the selected cue on the basis of the user input that moves the selected cue.

According to various embodiments of the disclosure, the processor 120 may provide a cancellation object for canceling a movement of the selected cue.

According to various embodiments of the disclosure, the processor 120 may remove displaying of another cue, which is not selected by the movement of the selected cue, and remove corresponding temporary capture data. Alternatively, the processor 120 may maintain displaying of the selected cue and displaying of another non-selected cue when the selected cue moves, and the processor 120 may maintain temporary capture data corresponding to the cues.

According to various embodiments of the disclosure, the processor 120 may provide a tool bar for supporting sharing of edit and/or capture data related to the capture data.

According to various embodiments of the disclosure, the processor 120 may detect an event in which the cue is selected by the user, and the selected cue is moved to an area of a particular window of the multi-window. The processor 120 may process an operation of sharing the capture data corresponding to the selected cue with the application of another window on the basis of the detection of the event.

Hereinafter, a method of operating the electronic device 101 according to various embodiments will be described in detail. According to various embodiments, the operations, which are performed by the electronic device 101 as described below, may be executed by the processor 120 including at least one processing circuit (processing circuitry) of the electronic device 101. According to the embodiment, the operations performed by the electronic device 101 may be stored in the memory 130. When the operations are executed, the operations may be executed by the instructions that allow the processor 120 to operate.

Figure 5:
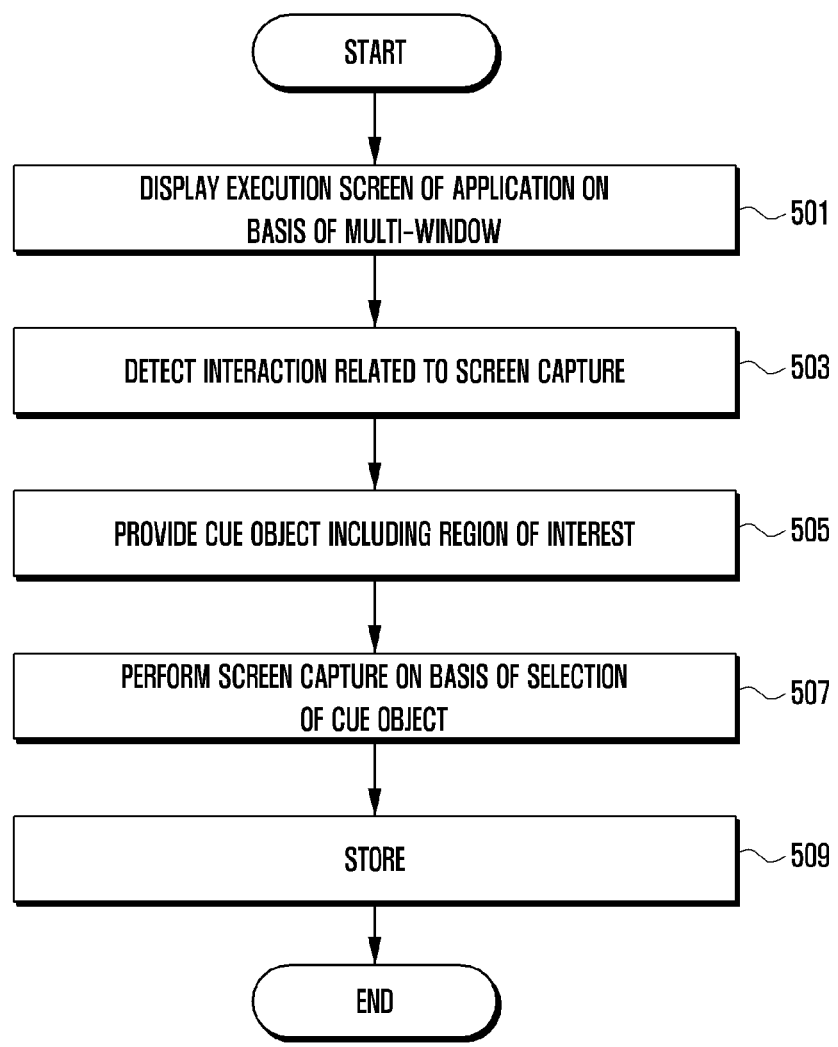
FIG. 5 is a flowchart illustrating an operation of the electronic device according to an embodiment of the disclosure.

FIG. 5 is a flowchart illustrating an operation of an electronic device according to an embodiment of the disclosure.

Referring to FIG. 5, in operation 501, the processor 120 of the electronic device 101 may display the execution screen of the application on the basis of the multi-window. According to the embodiment, the processor 120 may execute (e.g., perform multitasking on) at least two applications on the basis of the user input. According to the embodiment, the processor 120 may provide the multi-window including at least two windows (e.g., a first window, a second window, and a third window) corresponding to the applications that divide and execute the screen of the display module 160 on the basis of the execution of at least two applications. According to the embodiment, the processor 120 may control the display module 160 to display the execution screens of the applications in each window of the multi-window.

In operation 503, the processor 120 may detect the interaction related to the screen capture. According to the embodiment, the processor 120 may receive the interaction designated to execute the screen capture from the user while displaying the execution screens corresponding to the applications through the multi-window. According to the embodiment, the designated interactions may include at least one of a capture interaction using a hardware button of the electronic device 101, a capture interaction using the user's gesture, a capture interaction using voice (e.g., Bixby), a capture interaction using the electronic pen, or a capture interaction using a software button of an edge panel. According to the embodiment, the interaction designated to execute the screen capture will be described with reference to the drawings described below.

In operation 505, the processor 120 may provide (e.g., display) the cue including the region of interest of the application. According to the embodiment, the processor 120 may determine the region of interest of the corresponding application for each window in case that the screen capture is executed while the multi-window operates. For example, on the assumption of the two-split multi-window, the processor 120 identifies the first region of interest on the basis of the execution screen of the first application in the first window of the two-split multi-window and identify the second region of interest on the basis of the execution screen of the second application in the second window. According to the embodiment, the processor 120 may create and provide the first cue object corresponding to the first region of interest and the second cue object corresponding to the second region of interest. For example, the processor 120 creates (e.g., capture) an image (or capture data) corresponding to the entirety or a part of the region of interest and create the object (e.g., the floating icon) having a designated shape (e.g., a circular, quadrangular, or elliptical shape) by adjusting a size of (e.g., downsizing) the created image. According to the embodiment, the processor 120 may display the created object (e.g., the cue object) so that the object overlaps (or floats on) at least one execution screen in the designated area in the display module 160. The operation of providing the cue object according to the embodiment will be described with reference to the drawings described below.

In operation 507, the processor 120 may perform the operation related to the screen capture on the basis of the selection of the cue object. According to the embodiment, the processor 120 may determine the execution screen (or the application) to be captured on the basis of the cue object selected from the execution screen of the multi-window. For example, the user may select any one of the plurality of displayed cue objects on the basis of the designated user input. For example, the user selects the corresponding cue object on the basis of at least one of the air action using the touch input, the designated voice command, or the electronic pen. According to the embodiment, the processor 120 may identify the cue object selected on the basis of the user input and perform the screen capture on the basis of the region of interest of the execution screen corresponding to the cue object. According to the embodiment, the execution of the screen capture may include an operation of executing the screen capture (e.g., the screen capture only for the designated window) on the basis of the region of interest of the execution screen corresponding to the cue object; or an operation of calling the image (or the capture data), which is created previously (or in advance) and temporarily stored in the memory 130, to create the cue object.

In operation 509, the processor 120 may store a result of the screen capture (e.g., the capture data). According to the embodiment, the processor 120 may store the capture data (or the temporarily stored image) of the selected cue object in the memory 130 as a file. The processor 120 may remove the temporarily stored image (e.g., the capture data) of another non-selected cue object. According to some embodiments, the processor 120 may further include an operation of sharing the capture data with the application of another window. The operation of sharing the capture data with another application according to the embodiment will be described with reference to the drawings described below.

FIGS. 6A, 6B, 6C, and 6D are views for explaining examples of operating screens of an electronic device according to various embodiments of the disclosure.

According to the embodiment, FIGS. 6A, 6B, 6C, and 6D may illustrate various examples of operating the execution screen of the application on the basis of at least one window of the display module 160 in the electronic device 101. According to the embodiment, FIGS. 6A and 6B may illustrate an example in which the electronic device 101 is a bar-type form factor, and FIGS. 6C and 6D may illustrate an example in which the electronic device 101 is a foldable form factor. According to the embodiment, in the electronic device 101, the maximum number of split screens may vary depending on the size of the screen of the display module 160.

Figure 6A:
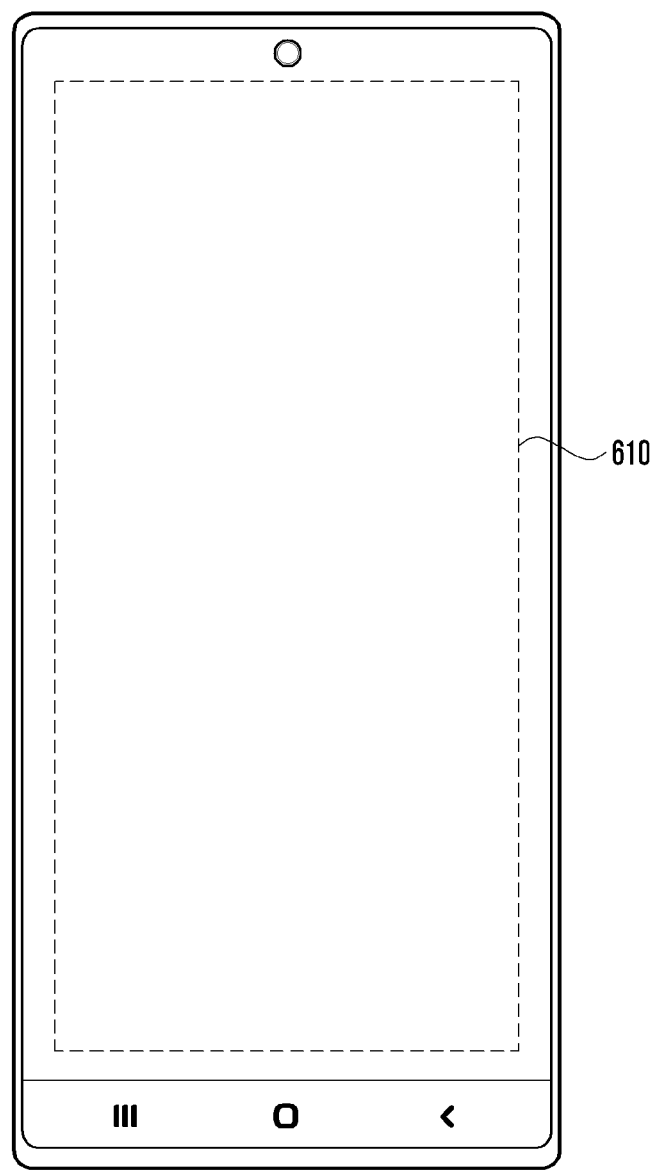
FIGS. 6A, 6B, 6C, and 6D are views for explaining examples of operating screens of an electronic device according to various embodiments of the disclosure.

Referring to FIG. 6A, the electronic device 101 may display a single execution screen corresponding to a single application on the basis of a single window 610.

Figure 6B:
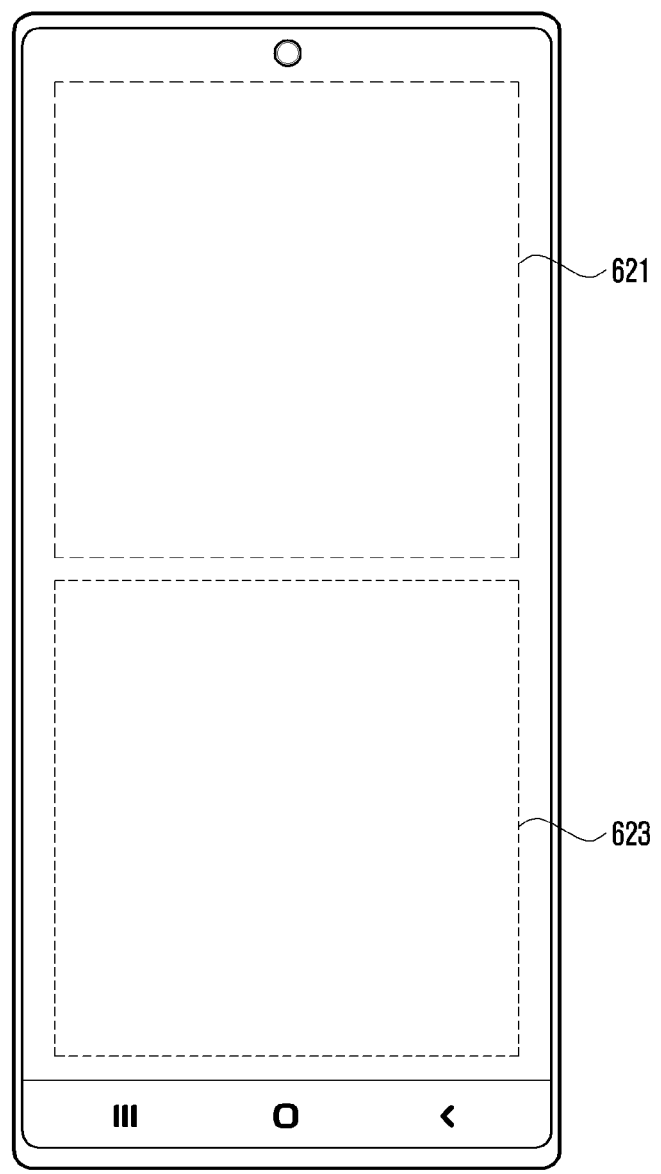

Referring to FIG. 6B, the electronic device 101 may display two different execution screens respectively corresponding to two applications on the basis of two-split multi-window (e.g., a first window 621 and a second window 623). For example, the electronic device 101 may display the first execution screen of the first application through the first window 621 and display the second execution screen of the second application different from the first application through the second window 623.

Figure 6C:
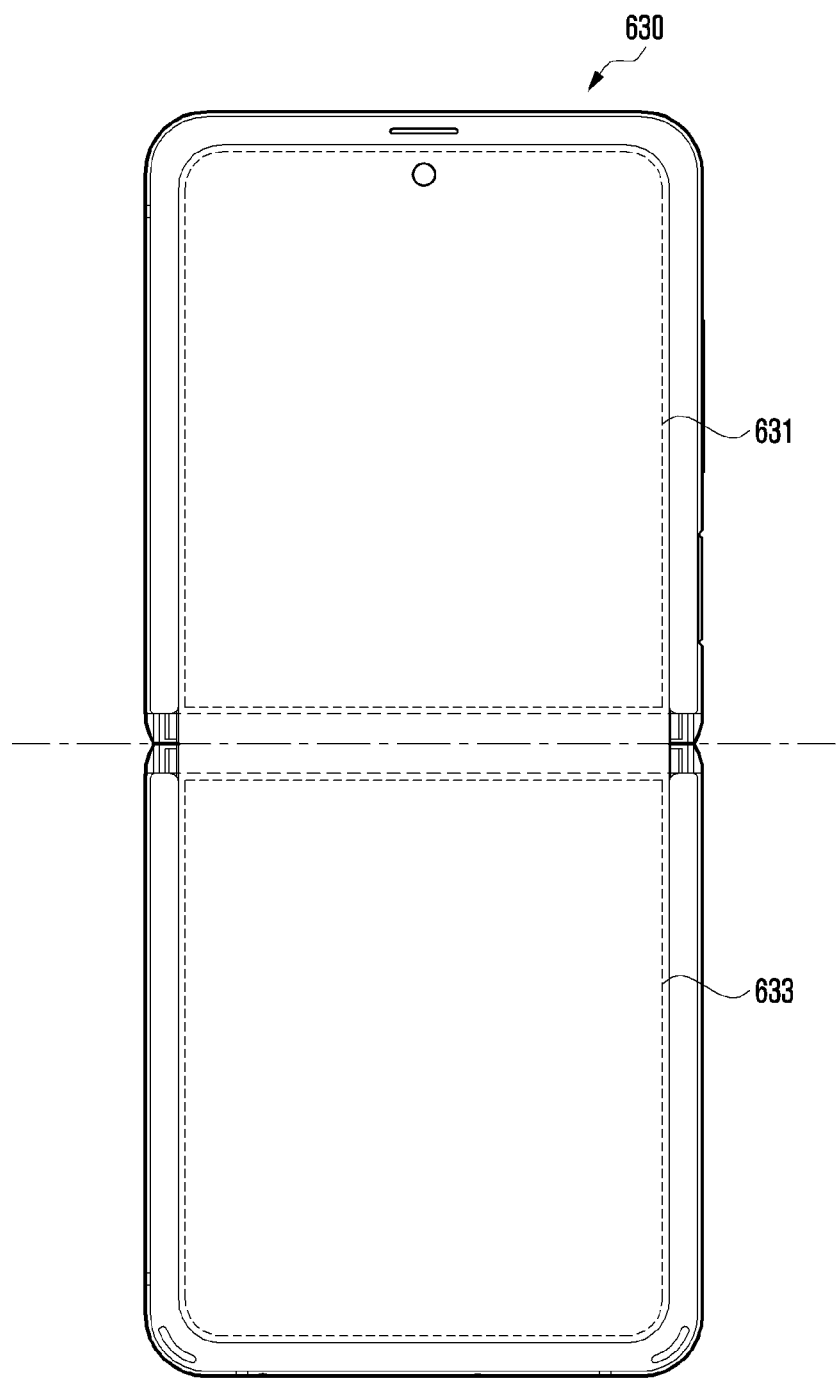

Referring to FIG. 6C, the electronic device 101 may display two different execution screens respectively corresponding to two applications on the basis of a two-split multi-window (e.g., a first window 631 and a second window 633).

Figure 6D:
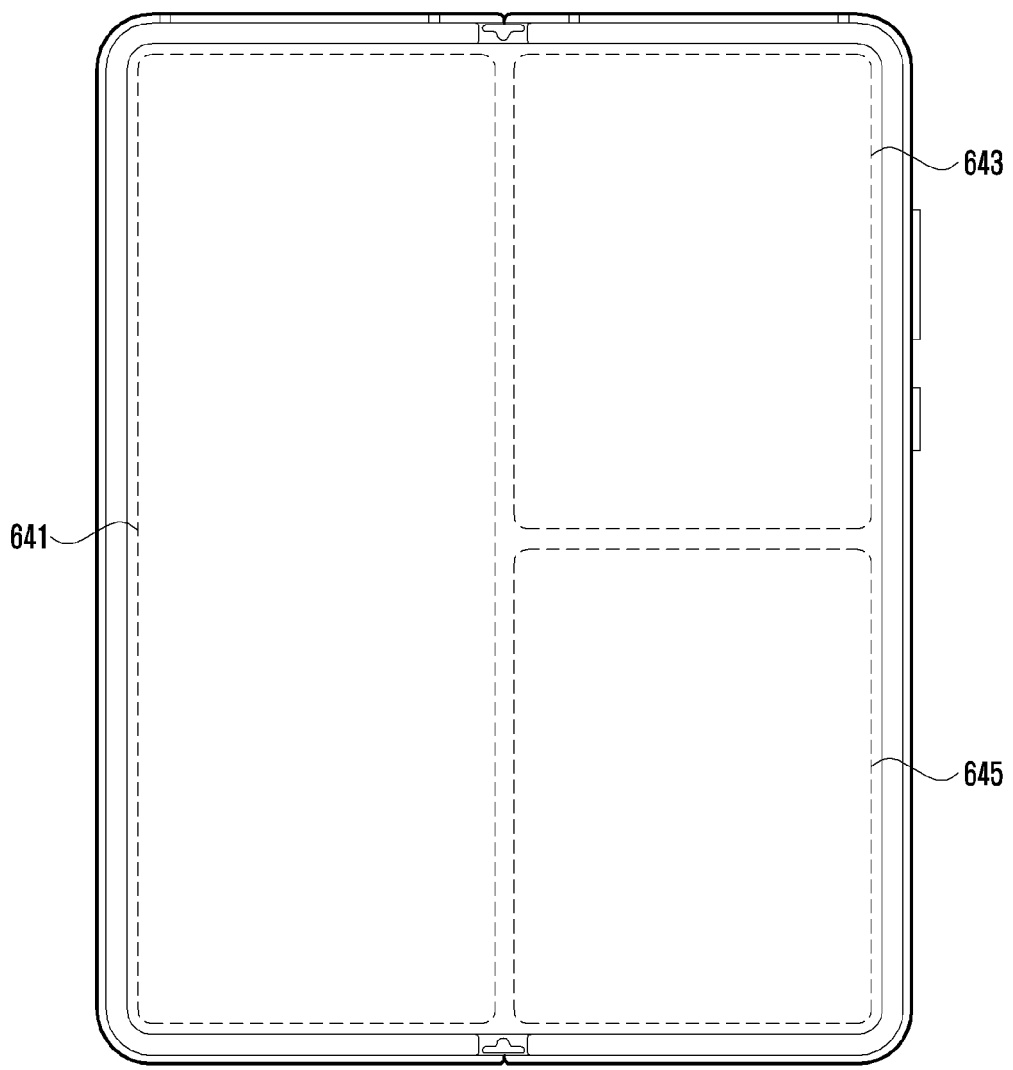

Referring to FIG. 6D, the electronic device 101 may display three different execution screens respectively corresponding to three applications on the basis of a three-split multi-window (e.g., a first window 641, a second window 643, and a third window 645). For example, the electronic device 101 simultaneously displays a first execution screen of a first application through the first window 641, display a second execution screen of a second application through the second window 643, and display a third execution screen of a third application through the third window 645.

According to various embodiments, the electronic device 101 may provide at least one of a single, two-split, three-split, or N-split screen (or the multi-window) on the basis of at least one of the form factor of the electronic device 101 or the size of the screen of the display module 160. According to the embodiment, the electronic device 101 may provide the execution screens of the plurality of different applications on the basis of the multi-window. The electronic device 101 may provide the screen capture related to the execution screen for each window instead of the entire screen of the display module 160 during the screen capture while the multi-window operates.

Figure 7A:
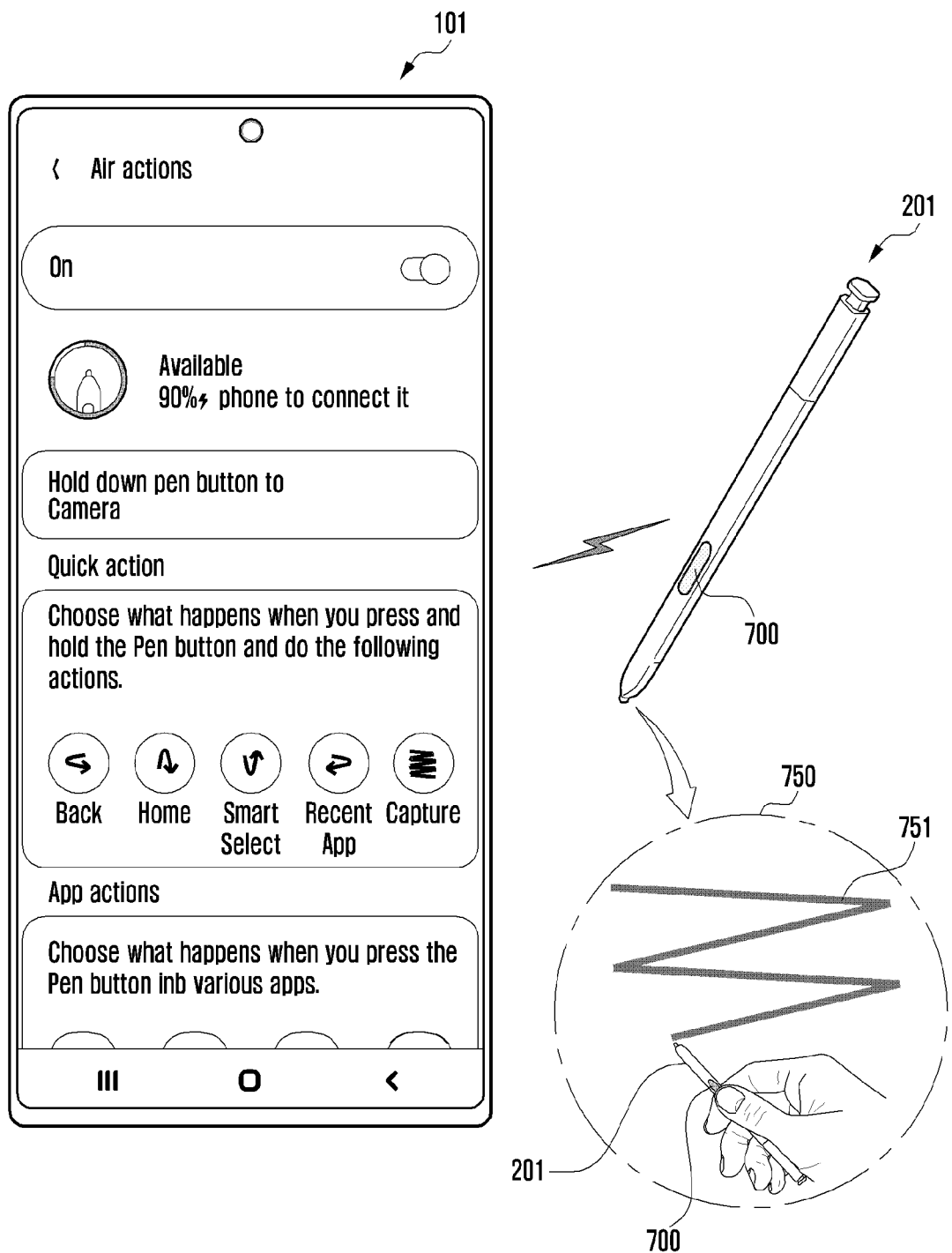
FIGS. 7A, 7B, and 7C are views for explaining interactions related to screen capture in an electronic device according to various embodiments of the disclosure.
Figure 7B:
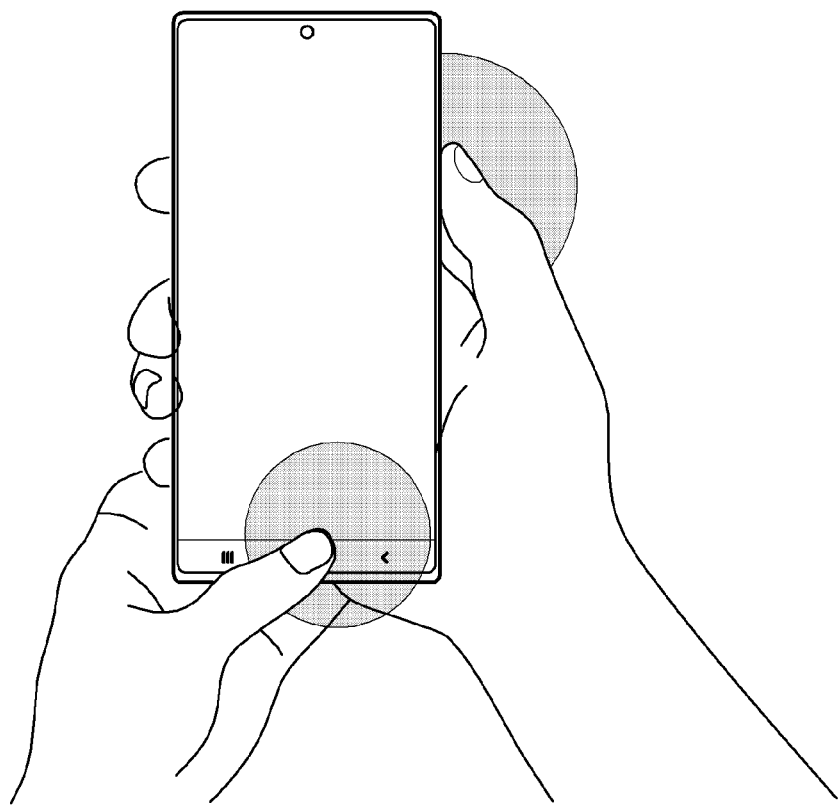
Figure 7C:
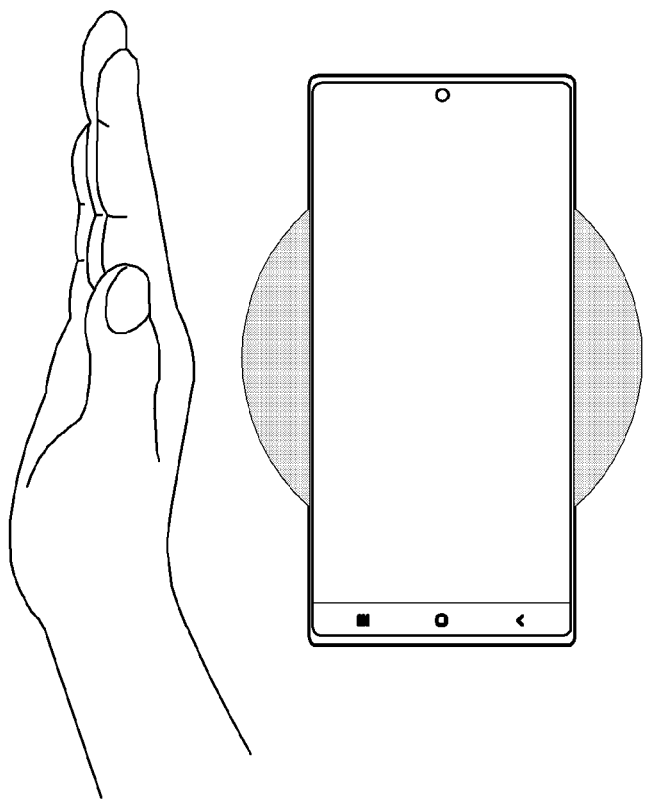

FIGS. 7A, 7B, and 7C are views for explaining interactions related to screen capture in an electronic device according to various embodiments of the disclosure.

According to the embodiment, FIGS. 7A, 7B, and 7C may illustrate various examples of interactions that may execute the screen capture in the electronic device 101. For example, the user may perform the capture by using the electronic device 101, perform the capture by using the external device such as the electronic pen, or perform the capture by using a voice command.

Referring to FIG. 7A, FIG. 7A may illustrate an example of supporting the screen capture by using the electronic pen 201 that may communicate with the electronic device 101. For example, FIG. 7A illustrates an example of the user interface capable of mapping the function (e.g., the screen capture function) according to the air action (or the air gesture) of the electronic pen 201 to support the screen capture by using the electronic pen 201. For example, FIG. 7A illustrates a series of operations in which a sensor (not illustrated) included in the electronic pen 201 is used for the air action (or the air gesture) of the electronic pen 201, the gesture interaction, which occurs in a state in which electronic pen 201 is held by the user's hand, is transmitted to the electronic device 101 through the OOB (e.g., BLE) communication and used as an event for executing the particular operation (e.g., the screen capture operation) by the application of the electronic device 101.

According to the embodiment, the electronic device 101 and the electronic pen 201 may be connected to each other in a communication manner through the OOB (e.g., BLE) communication. According to the embodiment, the user may execute the screen capture on the basis of the designated air action using the electronic pen 201. For example, as illustrated in an exemplified view 750 of FIG. 7A, in a state in which the user pushes a button 700 (e.g., an operation trigger button) of the electronic pen 201, the user transfers information for executing the screen capture to the electronic device 101 by using an air action (e.g., a zigzag action 751) mapped to execute the screen capture. To this end, the electronic device 101 may include an operation of mapping the air action (e.g., the zigzag action 751) and the function of the electronic device 101 on the basis of received information on the position of the electronic pen 201. For example, in the state in which the electronic device 101 is connected to the electronic pen 201 in a communication manner, the electronic device 101 maps the action (or the function) for each interaction by the electronic pen 201 while corresponding to at least one interaction (or gesture) operation of the electronic pen 201.

According to the embodiment, as illustrated in FIG. 7A, the electronic device 101 may provide a user interface connected to the electronic pen 201 in a communication manner and configured to map the function according to the air action of the electronic pen 201. According to the embodiment, as illustrated in an exemplified view 750 of FIG. 7A, in a state in which a user pushes a button 700 of the electronic pen 201, the user may perform the zigzag action 751 by using the electronic pen 201, and the electronic pen 201 may transfer information on the interaction (e.g., the zigzag interaction) corresponding to the user's zigzag action 751 to the electronic device 101 through the OOB communication. According to the embodiment, the electronic device 101 may map a first action (e.g., a screen capture function) while corresponding to the information (e.g., the zigzag interaction) received from the electronic pen 201. For example, as described above, the user may map the screen capture function according to the zigzag action 751 by using the electronic device 101 and the electronic pen 201.

According to the embodiment, as described above, the user may remotely execute the screen capture of the electronic device 101 by using the zigzag action 751 using the electronic pen 201 through the mapping operation. According to the embodiment, as illustrated in an exemplified view 750 of FIG. 7A, the user may perform the zigzag action 751 by using the electronic pen 201 in the air in the state in which the user pushes the button 700 of the electronic pen 201 to execute the screen capture. According to the embodiment, the electronic pen 201 may detect the zigzag action 751 and transfer information on the zigzag action 751 (e.g., the zigzag interaction) to the electronic device 101 through the OOB communication. According to the embodiment, when the electronic device 101 receives the information on the zigzag interaction from the electronic pen 201 while displaying the execution screen of the application, the electronic device 101 may identify the action (e.g., the screen capture function) mapped on the zigzag interaction and perform the screen capture.

According to various embodiments, as illustrated in FIG. 7A, various other functions may be mapped and executed in addition to the screen capture function according to the air action using the electronic pen 201. According to the embodiment, the user may perform a clamp action in a first direction by using the electronic pen 201, and the electronic pen 201 may transfer information on an interaction (e.g., a first clamp interaction) corresponding to the user's clamp action in the first direction to the electronic device 101 through the OOB communication.

According to the embodiment, the electronic device 101 may map a second action (e.g., a smart select function) while corresponding to the information (e.g., the clamp interaction in the first direction) received from the electronic pen 201. According to another embodiment, the user may perform a clamp action in a second direction by using the electronic pen 201, and the electronic pen 201 may transfer information on an interaction (e.g., a second clamp interaction) corresponding to the user's clamp action in the second direction to the electronic device 101 through the OOB communication. According to the embodiment, the electronic device 101 may map a third action (e.g., a home movement function) while corresponding to the information (e.g., the clamp interaction in the second direction) received from the electronic pen 201.

According to another embodiment, the user may perform a clamp action in a third direction by using the electronic pen 201, and the electronic pen 201 may transfer information on an interaction (e.g., a third clamp interaction) corresponding to the user's clamp action in the third direction to the electronic device 101 through the OOB communication. According to the embodiment, the electronic device 101 may map a fourth action (e.g., a back function) while corresponding to the information (e.g., the clamp interaction in the third direction) received from the electronic pen 201.

According to another embodiment, the user may perform a clamp action in a fourth direction by using the electronic pen 201, and the electronic pen 201 may transfer information on an interaction (e.g., a fourth clamp interaction) corresponding to the user's clamp action in the fourth direction to the electronic device 101 through the OOB communication. According to the embodiment, the electronic device 101 may map the information (e.g., a fifth action (e.g., recent application execution function)) received from the electronic pen 201.

According to the embodiment, the action mapping for each interaction may be variously designated (or configured), and the disclosure is not limited to the type of interaction.

Referring to FIG. 7B, FIG. 7B may illustrate an example of supporting the screen capture by using the hardware button of the electronic device 101. For example, in FIG. 7B, the interaction for the screen capture may be provided on the basis of an input of a button designated from the hardware buttons of the electronic device 101 or simultaneous inputs of a combination of the buttons.

Referring to FIG. 7C, FIG. 7C may illustrate an example of supporting the screen capture by recognizing the user's gesture by the electronic device 101. For example, in FIG. 7C, the interaction for the screen capture is provided on the basis of the user's hand (e.g., a hand edge) gesture (e.g., a gesture of placing the hand edge on the screen and pushing the hand edge toward the opposite side) in the electronic device 101.

Various embodiments are not limited to the interactions illustrated in FIGS. 7A, 7B, and 7C but provided for illustrative purposes. The interaction for the screen capture may be used in various other ways that may be provided by the electronic device 101. For example, the electronic device 101 provides a software button for the screen capture by using an edge panel and use the selection of the software button as the interaction. As another example, the electronic device 101 may use a designated voice command as an interaction on the basis of the user's voice.

Figure 8A:
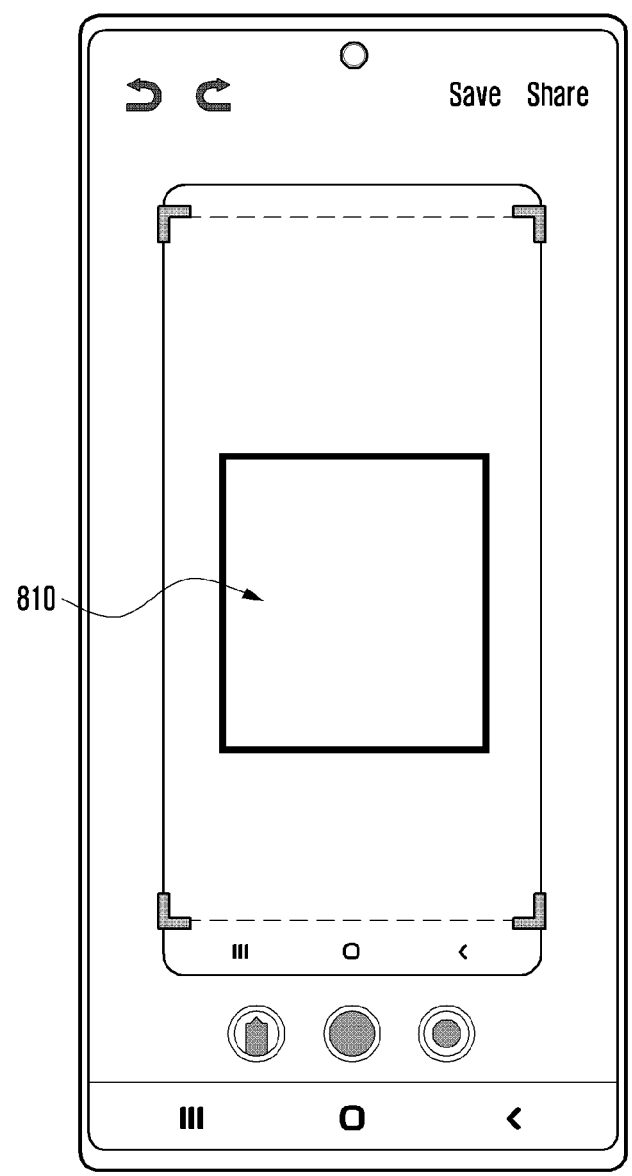
FIGS. 8A and 8B are views for explaining examples of configuring regions of interest in an electronic device according to various embodiments of the disclosure.
Figure 8B:
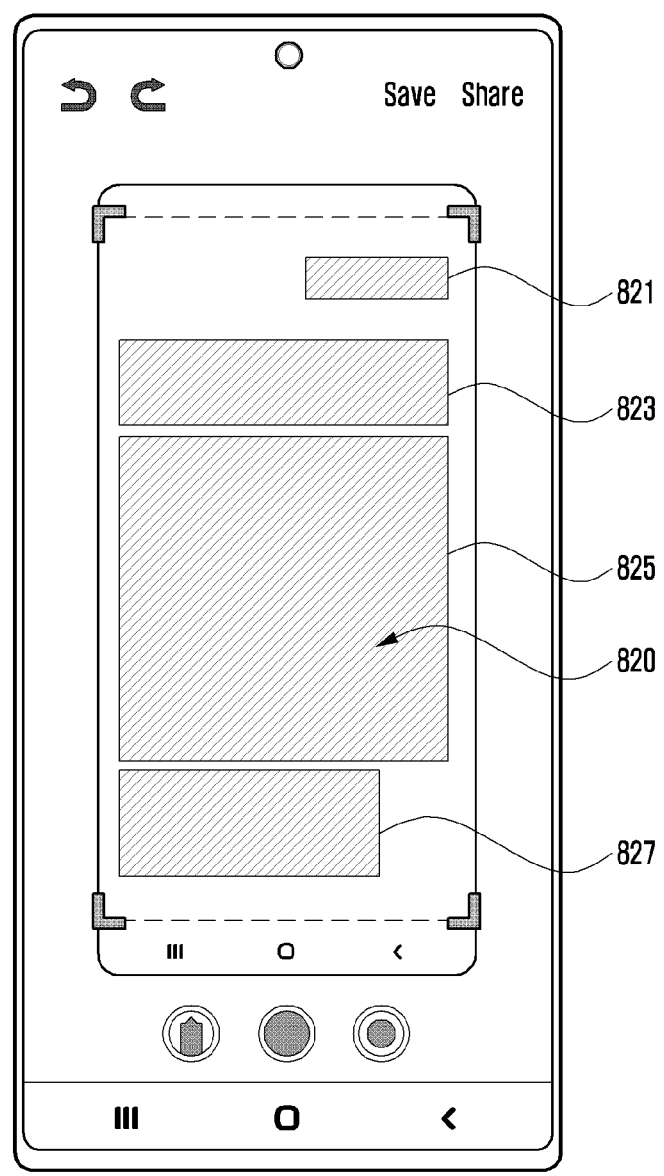

FIGS. 8A and 8B are views for explaining examples of configuring regions of interest in an electronic device according to various embodiments of the disclosure.

According to the embodiment, the feature information of the application may indicate a representative feature in the execution screen displayed through the window. Referring to FIG. 8A, the feature information may include area information (e.g., position or coordinate information) on an area (or a feature) in which an image and/or subject (e.g., the text) is concentrated. According to the embodiment, the electronic device 101 may configure a region 810 of interest on the basis of the feature information. Referring to FIG. 8B, the feature information may include area information on a plurality of areas 821, 823, 825, and 827 in which a plurality of images and/or subjects is concentrated. According to the embodiment, on the basis of the feature information, the electronic device 101 identifies an area relatively having the largest proportion (or area) (e.g., having the largest image area) among the plurality of areas 821, 823, 825, and 827 and configure the region 820 of interest on the basis of the corresponding feature information.

According to the embodiment, in case that the electronic device 101 detects the interaction designated to execute the screen capture from the user, the electronic device 101 may identify the region of interest on the basis of the feature information on the screen (e.g., the execution screen of the application) displayed on at least one window (or display). For example, the electronic device 101 displays the execution screens of one or more applications on the basis of the single window, the two-split window, the three-split window, or the N-split window.

According to the embodiment, in a single window operation, the electronic device 101 may identify the feature information in the single execution screen and configure the single region of interest on the basis of the single feature information. According to the embodiment, in the multi-window operation, the electronic device 101 may identify the feature information in the execution screen for the respective windows and configure a plurality of regions of interest on the basis of the feature information.

Figure 9A:
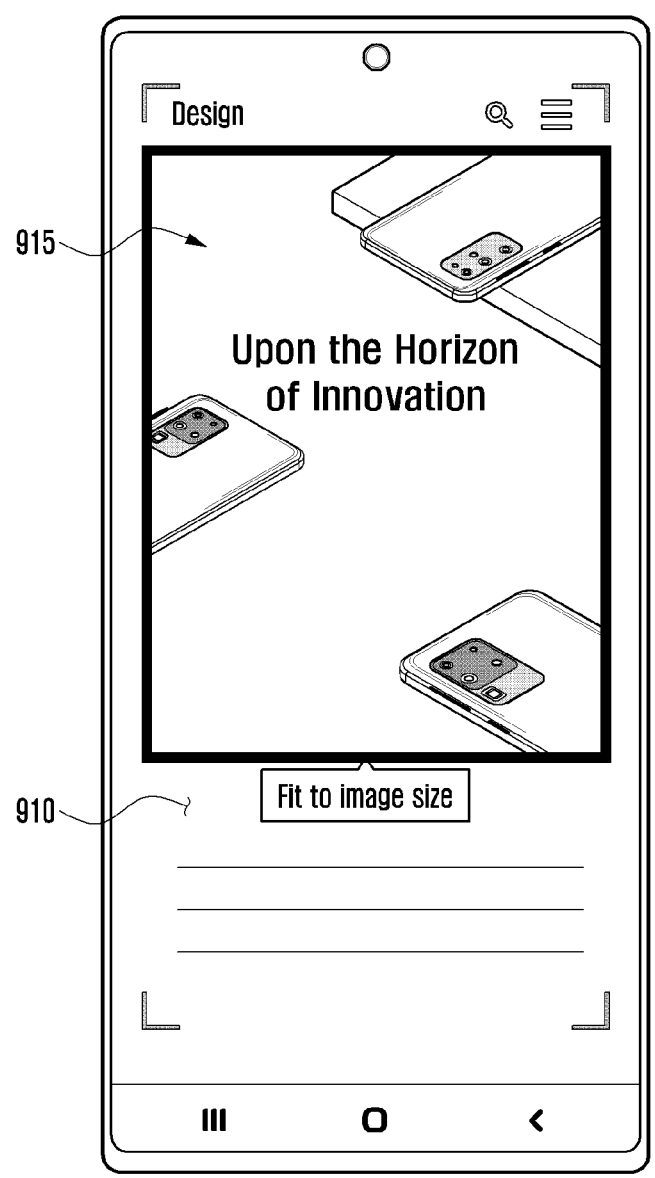
FIGS. 9A and 9B are views for explaining examples of providing feedback on regions of interest in an electronic device according to various embodiments of the disclosure.
Figure 9B:
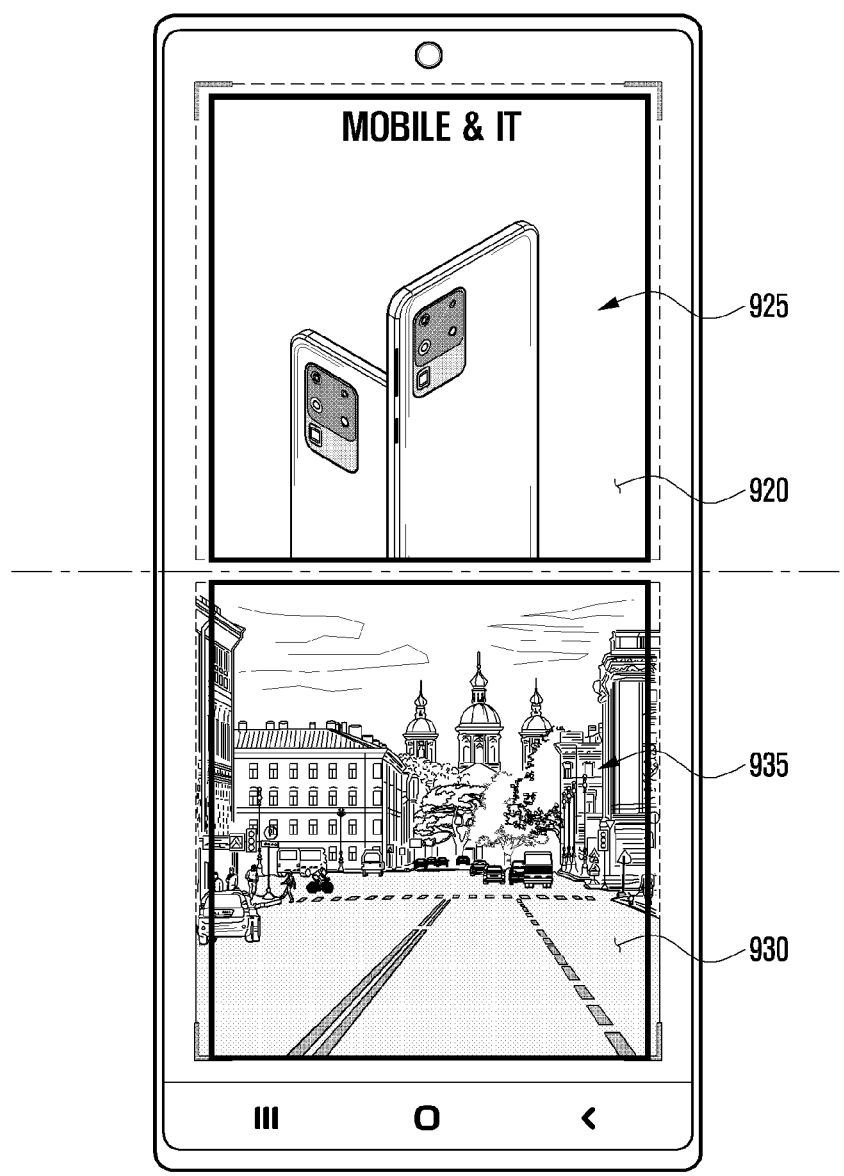

FIGS. 9A and 9B are views for explaining examples of providing feedback on regions of interest in an electronic device according to various embodiments of the disclosure.

According to the embodiment, FIGS. 9A and 9B may illustrate various examples of configuring the region of interest in the execution screen of the application on the basis of at least one window of the display module 160 of the electronic device 101.

Referring to FIG. 9A, the electronic device 101 may display a single execution screen 910 corresponding to a single application on the basis of a single window. According to the embodiment, the electronic device 101 may provide the feedback on the feature information-based region 915 of interest in the displayed execution screen 910. According to the embodiment, the electronic device 101 may display an area including the feature information-based region 915 of interest in the execution screen 910 by emphasizing the area in a designated way. For example, the electronic device 101 guides the area including the region 915 of interest to the user in the execution screen 910 of the application displayed on the display module 160 by using an object (e.g., a quadrangular box and/or an icon) indicating the region 915 of interest.

Referring to FIG. 9B, the electronic device 101 may display N execution screens (e.g., a first execution screen 920 and a second execution screen 930) respectively corresponding to N applications on the basis of an N-split (e.g., N=2) multi-window (e.g., a first window A and second window B). According to the embodiment, the electronic device 101 may provide feedback on feature information-based regions of interest (e.g., a first region 925 of interest corresponding to the first execution screen 920 and a second region 935 of interest corresponding to the second execution screen) in the execution screens 920 and 930. According to the embodiment, the electronic device 101 may provide the user with feedback on the regions 925 and 935 of interest by emphasizing the area including the regions 925 and 935 of interest in a designated way on the basis of the feature information in the execution screens 920 and 930.

According to the embodiment, the objects (e.g., the quadrangular box and/or the icon) indicating the regions of interest (e.g., 915, 925, and 935) may have designated colors. The objects may disappear after the objects are displayed for a designated predetermined time (e.g., M seconds, M is a natural number). According to the embodiment, the regions of interest (e.g., 915, 925, and 935) may have sizes corresponding to the area information based on the feature information. For example, the regions of interest have different sizes for the respective execution screens in accordance with the execution information. According to some embodiments, the regions of interest (e.g., 915, 925, and 935) may have pre-designated sizes and be adaptively adjusted in sizes in accordance with the feature information. For example, the regions of interest (e.g., 915, 925, and 935) are configured to have a size of about 12% or more and about 90% or less of the window (e.g., the entire screen capture area in the window).

According to the embodiment, the regions of interest (e.g., 915, 925, and 935) may be created while including a portion visible to the execution screen in the window or created while including a portion invisible from the execution screen in accordance with the feature information. For example, the regions of interest (e.g., 915, 925, and 935) include the largest image area in the execution screen of the application. According to the embodiment, the electronic device 101 may analyze the area in the execution screen at a screen capture point in time on the basis of the interaction.

According to various embodiments, the electronic device 101 may perform the screen capture corresponding to the interaction while guiding the region of interest (e.g., 915, 925, and 935) on the basis of the interaction. According to the embodiment, the electronic device 101 may create and provide a cue object (e.g., an information object in respect to temporary capture data) on the basis of the region of interest (e.g., 915, 925, and 935) in the screen capture operation. An example of providing the cue object will be described with reference to FIGS. 10A and 10B.

Figure 10A:
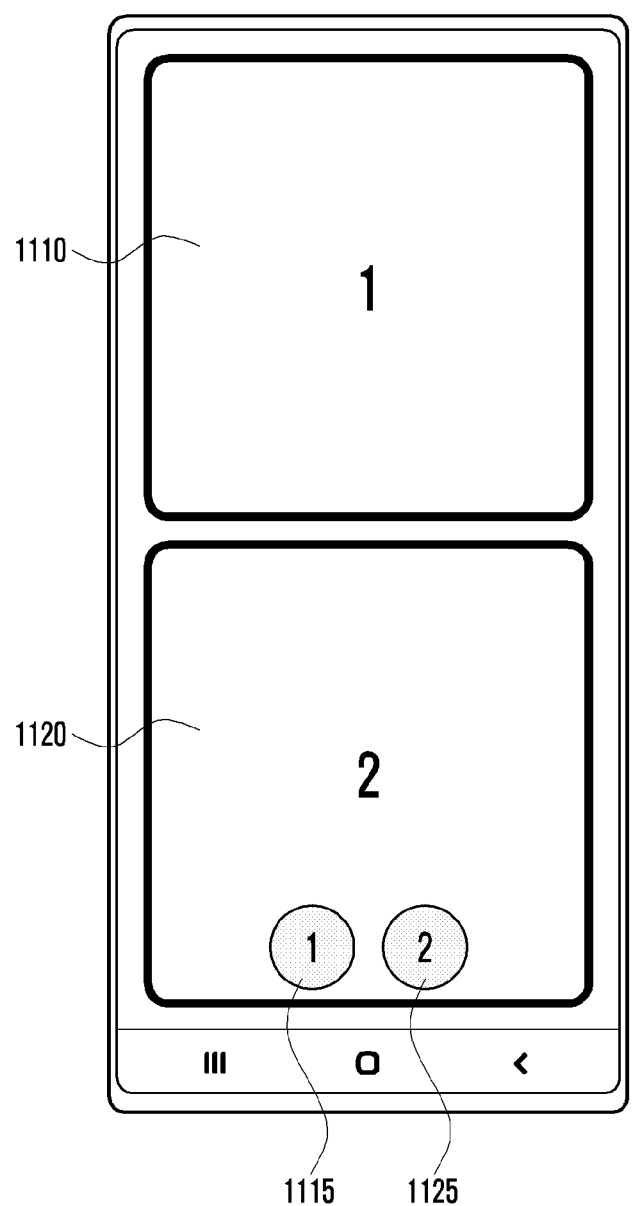
FIGS. 10A, 10B, and 10C are views for explaining examples of providing cue objects related to screen capture in an electronic device according to various embodiments of the disclosure.
Figure 10B:
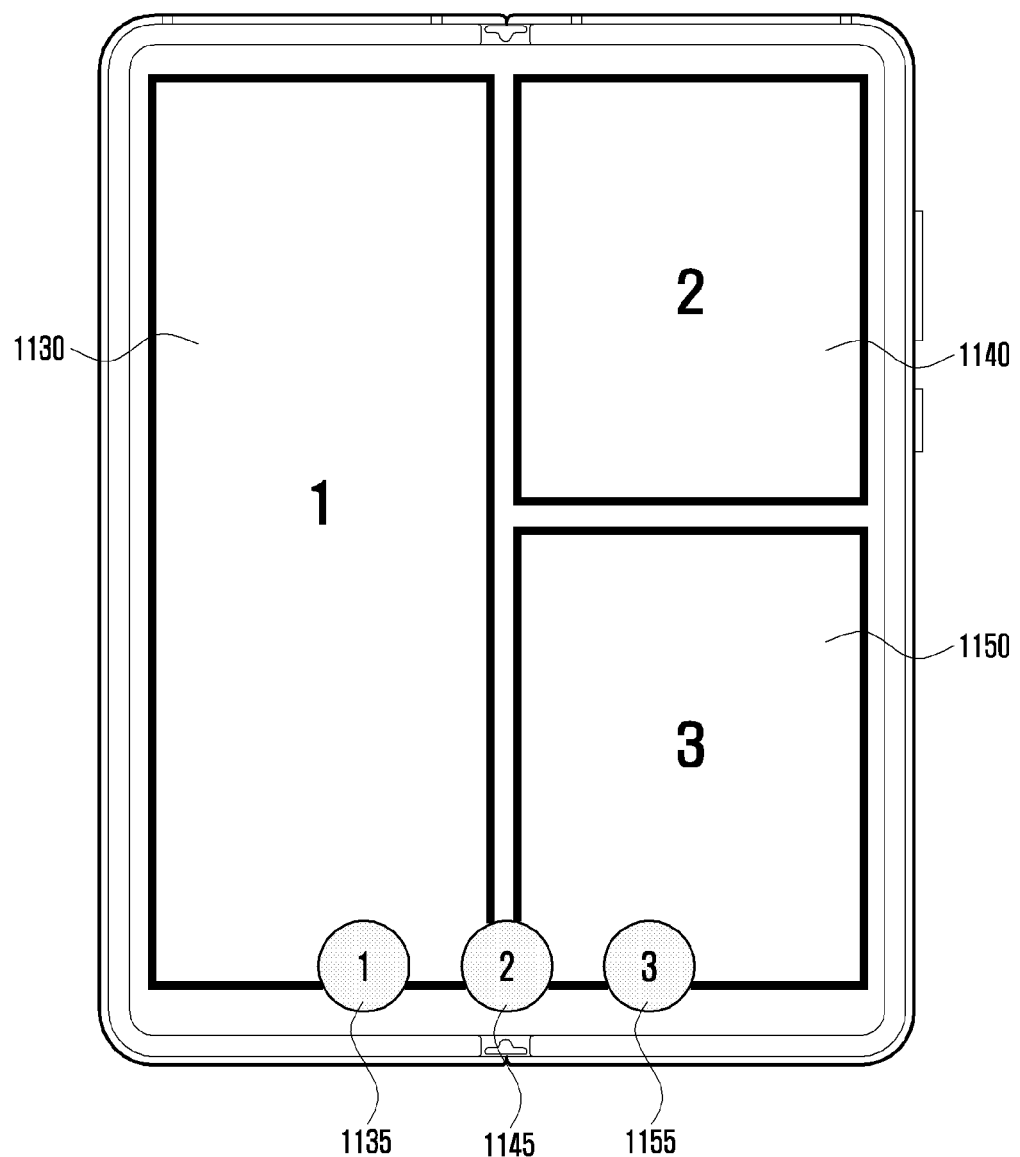
Figure 10C:
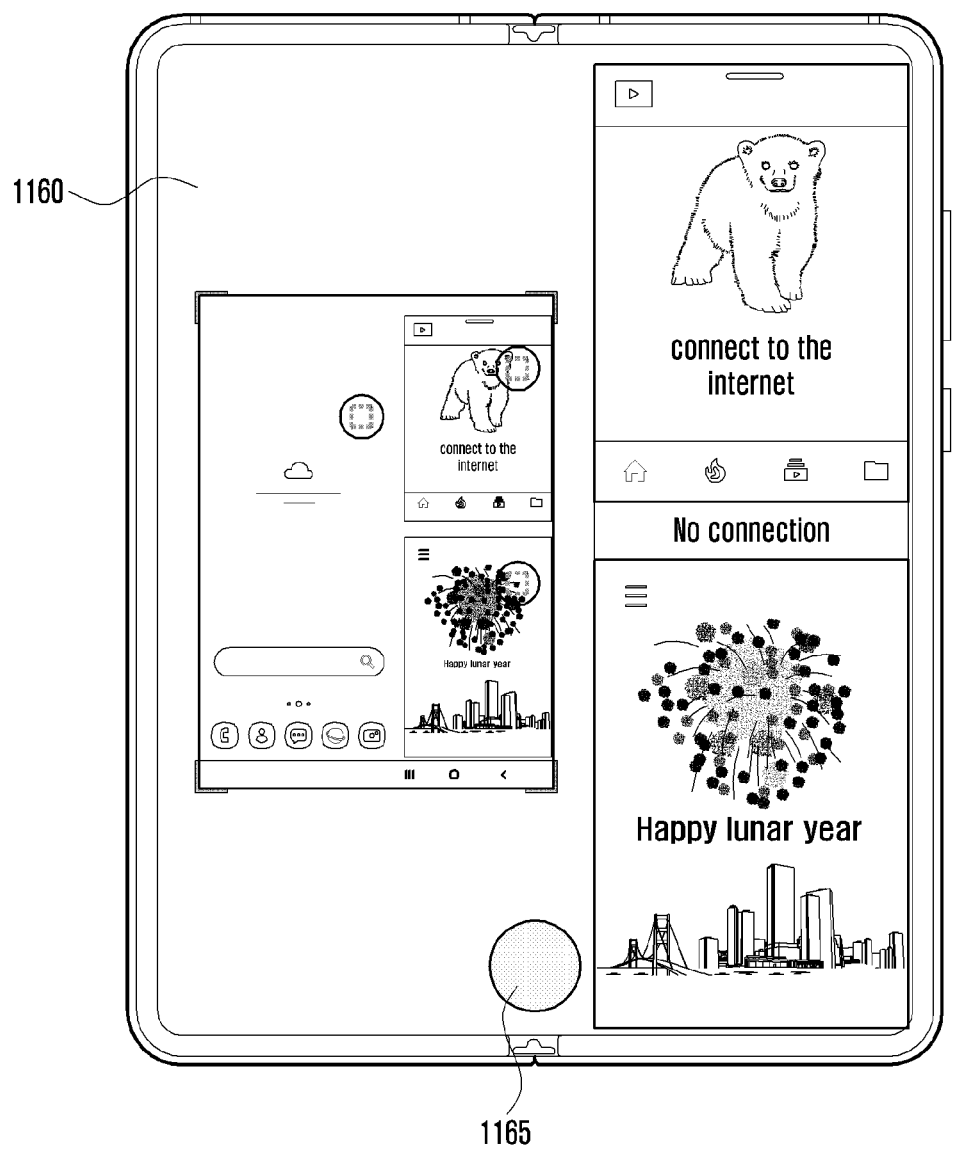

FIGS. 10A, 10B, and 10C are views for explaining examples of providing cue objects related to screen capture in an electronic device according to various embodiments of the disclosure.

Referring to FIGS. 10A, 10B, and 10C, the electronic device 101 may provide cue objects 1115, 1125, 1135, 1145, and 1155 respectively corresponding to the windows of the multi-window. For example, the electronic device 101 includes the cue objects 1115, 1125, 1135, 1145, and 1155 corresponding in number to the split screens. According to some embodiments, the electronic device 101 may further include a cue object 1165 (or a full-screen cue) corresponding to the single (or the entire) window (e.g., the entire screen) in addition to the cue objects 1115, 1125, 1135, 1145, and 1155 (or the window cues) respectively corresponding to the windows of the multi-window.

According to the embodiment, with reference to FIG. 10A, FIG. 10A may illustrate an example made in case that the electronic device 101 performs the screen capture on the basis of the interaction in a two-split multi-window environment. According to the embodiment, the electronic device 101 may provide the user with the cues (e.g., the window cues) related to the respective windows 1110 and 1120. For example, the electronic device 101 is divided into the first window 1110 and the second window 1120 of the two-split window. The electronic device 101 may display the first execution screen of the first application through the first window 1110 and display the second execution screen of the second application through the second window 1120.

According to the embodiment, in case that the electronic device 101 detects the interaction designated to execute the screen capture in the multi-window environment, the electronic device 101 may identify the respective regions of interest on the basis of the execution screens of the windows 1110 and 1120. According to the embodiment, the electronic device 101 may create and provide the cue objects 1115 and 1125 (e.g., the information object in respect to the temporary capture data) respectively corresponding to the regions of interest on the basis of the regions of interest.

According to the embodiment, the electronic device 101 may create the first cue object 1115 related to the first window 1110 and the second cue object 1125 related to the second window 1120 from the regions of interest of the respective windows 1110 and 1120. For example, the electronic device 101 creates (e.g., capture) an image (or capture data) corresponding to the entirety or a part of the region of interest and create cue objects 1115 and 1125 (e.g., floating icons) each having a designated shape (e.g., a circular, quadrangular, or elliptical shape) by adjusting a size of (e.g., downsizing) the created image. According to the embodiment, the processor 120 may display the created cue objects 1115 and 1125 so that the cue objects overlap at least one execution screen (or window) in the designated area (e.g., the screen lower end area) in the display module 160. According to some embodiments, the cue objects 1135, 1145, and 1155 may float at any position on at least one execution screen (or window).

According to the embodiment, with reference to FIG. 10B, FIG. 10B may illustrate an example made in case that the electronic device performs the screen capture based on the interaction in a three-split multi-window environment. According to the embodiment, the electronic device 101 may provide the user with the cues (or the window cues) related to the respective windows 1130, 1140, and 1150. For example, the electronic device 101 is divided into the first window 1130, the second window 1140, and the third window 1150 of the three-split window. The electronic device 101 may display the first execution screen of the first application through the first window 1130, display the second execution screen of the second application through the second window 1140, and display the third execution screen of the third application through the third window 1150.

According to the embodiment, in case that the electronic device 101 detects the interaction designated to execute the screen capture in the multi-window environment, the electronic device 101 may identify the respective regions of interest on the basis of the execution screens of the windows 1130, 1140, and 1150. According to the embodiment, the electronic device 101 may create and provide the cue objects 1135, 1145, and 1155 respectively corresponding to the regions of interest on the basis of the regions of interest.

According to the embodiment, the electronic device 101 may create the first cue object 1135 related to the first window 1110, the second cue object 1145 related to the second window 1140, and the third cue object 1155 related to the third window 1150 from the regions of interest of the respective windows 1130, 1140, and 1150. For example, the electronic device 101 creates (e.g., capture) an image (or capture data) corresponding to the entirety or a part of the region of interest and create cue objects 1135, 1145, and 1155 (e.g., floating icons) each having a designated shape (e.g., a circular, quadrangular, or elliptical shape) by adjusting a size of (e.g., downsizing) the created image.

According to the embodiment, the processor 120 may display the created cue objects 1135, 1145, and 1155 so that the cue objects overlap at least one execution screen (or window) in the designated area (e.g., the screen lower end area) in the display module 160. According to some embodiments, the cue objects 1135, 1145, and 1155 may float at any position on at least one execution screen (or window).

According to the embodiment, with reference to FIG. 10C, FIG. 10C may illustrate an example made in case that the electronic device performs the screen capture on the basis of the interaction in a single-window environment. According to the embodiment, the electronic device 101 may provide the user with the cue (or the full-screen cue) related to the single window 1160. For example, the electronic device 101 displays the execution screen of the application through the single window (e.g., the entire screen).

According to the embodiment, in case that the electronic device 101 detects the interaction designated to execute the screen capture in the single-window environment, the electronic device 101 may identify the region of interest on the basis of the execution screen of the single window 1160. According to the embodiment, the electronic device 101 may create and provide the cue object 1165 corresponding to the region of interest on the basis of the region of interest.

According to the embodiment, the electronic device 101 may create the cue object 1165 related to the single window 1160 from the region of interest of the window 1160. For example, the electronic device 101 creates (e.g., capture) an image (or capture data) corresponding to the entirety or a part of the region of interest and create the cue object 1165 (e.g., the floating icon) having a designated shape (e.g., a circular, quadrangular, or elliptical shape) by adjusting a size of (e.g., downsizing) the created image.

According to the embodiment, the processor 120 may display the created cue object 1165 so that the cue object overlaps at least one execution screen (or window) in the designated area (e.g., the screen lower end area) in the display module 160. According to some embodiments, the cue object 1165 may float at any position on at least one execution screen (or window). According to some embodiments, the electronic device 101 may not provide the cue object in the single window on the basis of the configuration of the electronic device 101.

According to the embodiment, in the electronic device 101, the intervals between the cue objects may be disposed (or aligned) as designated intervals when the cue objects 1115, 1125, 1135, 1145, 1155, and 1165 are provided, as illustrated in FIGS. 10A, 10B, and 10C. According to the embodiment, the arrangement order of the cue objects 1115, 1125, 1135, 1145, 1155, and 1165 may conform to the order of the windows of the multi-window, for example.

For example, the order of the windows is configured as the order from the left side to the right side in a '—' shape in the case of the two-split window. The order of the windows is configured as the order from the left side to the right upper side and from the right upper side to the right lower side in a '¬' shape in the case of the three-split window. The order of the windows is configured as the order from the left upper side to the left lower side, from the left lower side to the right upper side, and from the right upper side to the right lower side in a reversed N ( ) shape in the case of the four-split window. However, the disclosure is not limited thereto. According to the embodiment, the cue objects may be disposed from the left side to the right side (e.g., a horizontal arrangement) or from the upper side to the lower side (e.g., a vertical arrangement) depending on the priority according to the order of the windows.

According to the embodiment, the electronic device 101 may provide tool bars (e.g., tool bars 1230 and 1340 in FIG. 12 and/or FIG. 13) for editing the capture data when the cue objects 1115, 1125, 1135, 1145, 1155, and 1165 are provided. According to some embodiments, the electronic device 101 may be disabled after the cue objects 1115, 1125, 1135, 1145, 1155, and 1165 and/or the tool bars 1230 and 1340 are displayed for a designated predetermined time (e.g., M seconds, M is a natural number).

According to the embodiment, the capture data of the execution screens respectively corresponding to the windows 1110, 1120, 1130, 1140, and 1150 for the cue objects 1115, 1125, 1135, 1145, 1155, and 1165 may be temporarily stored without being stored in the screen capture operation. For example, the electronic device 101 temporarily stores the capture data in a temporary storage device (a temporary storage or a temporary memory) (or a buffer) ensured in the memory 130 in order to preserve an intermediate result (e.g., temporary capture data) during the screen capture operation. According to the embodiment, the electronic device 101 may process, at the background, the operation of creating the cue objects 1115, 1125, 1135, 1145, 1155, and 1165 (e.g., the floating icons) on the basis of the temporarily stored capture data.

According to some embodiments, in case that any one cue object is selected from the cue objects 1115, 1125, 1135, 1145, 1155, and 1165, the electronic device 101 may store the capture data related to the selected cue object in the memory 130 and remove temporary capture data related to the other non-selected cue objects (or the remaining cue objects) from the memory 130.

According to some embodiments, in case that any one cue object is selected (e.g., tapped) from the cue objects 1115, 1125, 1135, 1145, 1155, and 1165, the electronic device 101 may call and display an edit screen in a state in which the window corresponding to the selected cue object is automatically selected. According to the embodiment, the user may support that the region of interest for the capture data in the corresponding window is immediately edited in the edit screen. According to some embodiments, in case that the cue object is selected, the electronic device 101 may call and display the tool bars 1230 and 1340 in the state in which the window corresponding to the selected cue object is automatically selected.

According to the embodiment, the user may execute tasks related to the editing, storing, and/or sharing the region of interest for the capture data in the corresponding window by using the tool bars 1230 and 1240. According to some embodiments, in case that any one cue object is selected and held (e.g., tapped & held or long pressed) from the cue objects 1115, 1125, 1135, 1145, 1155, and 1165, the electronic device 101 may determine that the capture data corresponding to the cue objects are inserted into the execution screen of the application of the designated (or dragged) window. For example, the electronic device 101 inserts the capture data corresponding to the cue object into the application on the basis of the user input (e.g., drag & drop) according to the selection of the cue object by the user. This operation will be described with reference to the drawings (e.g., FIG. 12 and/or FIG. 13) described below.

Figure 11:
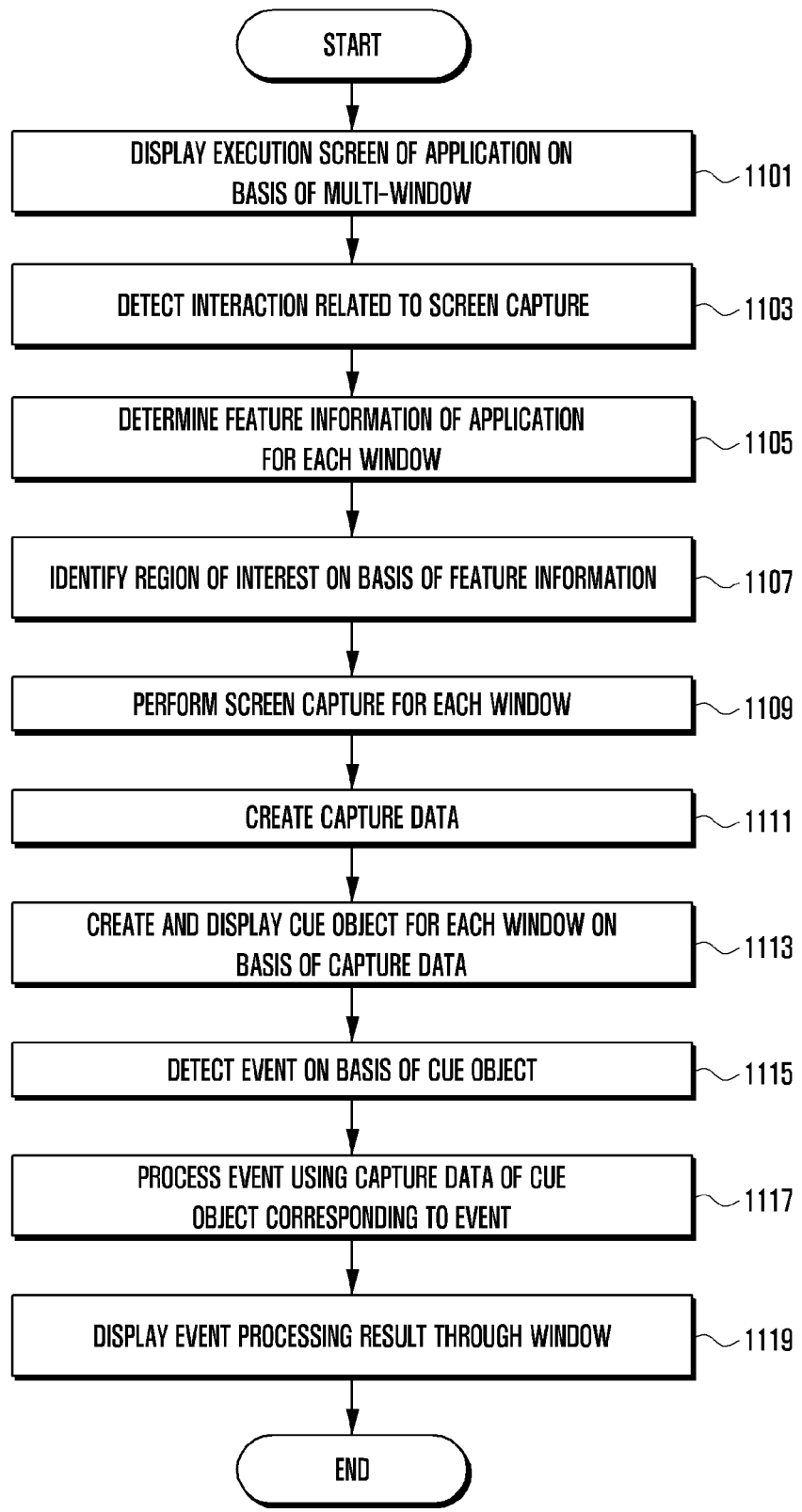
FIG. 11 is a flowchart illustrating an operation of an electronic device according to an embodiment of the disclosure.

FIG. 11 is a flowchart illustrating an operation of an electronic device according to an embodiment of the disclosure.

Referring to FIG. 11, in operation 1101, the processor 120 of the electronic device 101 may display the execution screen of the application on the basis of the multi-window. According to the embodiment, the processor 120 may execute (e.g., perform multitasking on) at least two applications on the basis of the user input. According to the embodiment, the processor 120 may provide the multi-window including at least two windows (e.g., the first window, the second window, and the third window) corresponding to the applications that divide and execute the screen of the display module 160 on the basis of the execution of at least two applications. According to the embodiment, the processor 120 may control the display module 160 to display the execution screens of the applications in each window of the multi-window.

In operation 1103, the processor 120 may detect the interaction related to the screen capture. According to the embodiment, the processor 120 may receive the interaction designated to execute the screen capture from the user while displaying the execution screens corresponding to the applications through the multi-window. According to the embodiment, the designated interactions may include at least one of the capture interaction using the hardware button of the electronic device 101, the capture interaction using the user's gesture, the capture interaction using voice (e.g., Bixby), the capture interaction using the electronic pen, or the capture interaction using the software button of the edge panel.

In operation 1105, the processor 120 may determine the feature information of the application for each window on the basis of the detection of the interaction. According to the embodiment, the processor 120 may determine the feature information for each window on the basis of the execution screen corresponding to the application being executed through the multi-window. According to the embodiment, the feature information of the application may indicate the representative feature in the execution screen displayed through the window. For example, the feature information includes area information (e.g., the position or coordinate information) on the area (or the feature) in which the image and/or subject (e.g., the text) is concentrated.

In operation 1107, the processor 120 may identify (or configure) the region of interest on the basis of the feature information. According to the embodiment, the processor 120 may identify the feature information-based region of interest in the displayed execution screen on the basis of the multi-window. According to the embodiment, the region of interest may be created while including a portion visible to the execution screen in the window or created while including a portion invisible from the execution screen in accordance with the feature information. According to the embodiment, the processor 120 may analyze the area in the execution screen at a screen capture point in time on the basis of the interaction. According to some embodiments, the processor 120 may provide the user with feedback on the region of interest by emphasizing the area including the region of interest in a designated way on the basis of the feature information in the execution screen for each window.

In operation 1109, the processor 120 may perform the screen capture for each window. According to the embodiment, the processor 120 may perform the screen capture for each window of the multi-window on the basis of the detection of the interaction. According to the embodiment, the processor 120 may perform the screen capture on the basis of the respective regions of interest identified on the basis of the first execution screen of the first window and the second execution screen of the second window.

In operation 1111, the processor 120 may create the capture data. According to the embodiment, the processor 120 may create the capture data for each window by capturing the entirety or a part of the region of interest. According to the embodiment, the processor 120 may temporarily store the created capture data in the temporary storage device (or the buffer) ensured in the memory 130 in order to preserve an intermediate result (e.g., temporary capture data) during the screen capture operation.

In operation 1113, the processor 120 may create and display the cue object for each window on the basis of the capture data. According to the embodiment, the processor 120 may process, at the background, the operation of creating the cue object (e.g., the floating icon) on the basis of the temporarily stored capture data. According to the embodiment, on the assumption of the two-split multi-window, the processor 120 may provide the first cue object related to the first window on the basis of the capture data created on the basis of the region of interest of the first execution screen of the first window and provide the second cue object related to the second window on the basis of the capture data created on the basis of the region of interest of the second execution screen of the second window. According to the embodiment, the processor 120 may provide an object (e.g., a floating icon) having a shape (e.g., a circular, quadrangular, or elliptical shape) designated by adjusting the magnitude of (e.g., downsizing) the capture data (e.g., the image) as the cue object.

In operation 1115, the processor 120 may detect an event on the basis of the cue object. According to the embodiment, the processor 120 may detect an event (e.g., drag & drop) in which the cue object is selected by the user and the selected cue object moves to a position (or an area) of a particular window of the multi-window. According to the embodiment, the processor 120 may process an event (e.g., drag & drop) operation of inserting the capture data (e.g., the capture data of the first application) corresponding to the selected cue object into the particular application execution screen (e.g., the execution screen of the second application) on the basis of the detection of the event.

In operation 1117, the processor 120 may process the event by using the capture data of the cue object corresponding to the event. According to the embodiment, the processor 120 may transmit the capture data (e.g., the capture data of the first application) corresponding to the selected cue object to the second application. According to the embodiment, the processor 120 may process the operation of sharing the capture data with the application of another window.

In operation 1119, the processor 120 may display an event processing result through the window. According to the embodiment, the processor 120 may display the event processing result (e.g., the screen in which the capture data are inserted into the execution screen) on the basis of the window in which the cue object is moved according to the event (e.g., the window in which the execution screen of the second application is displayed).

Figure 12:
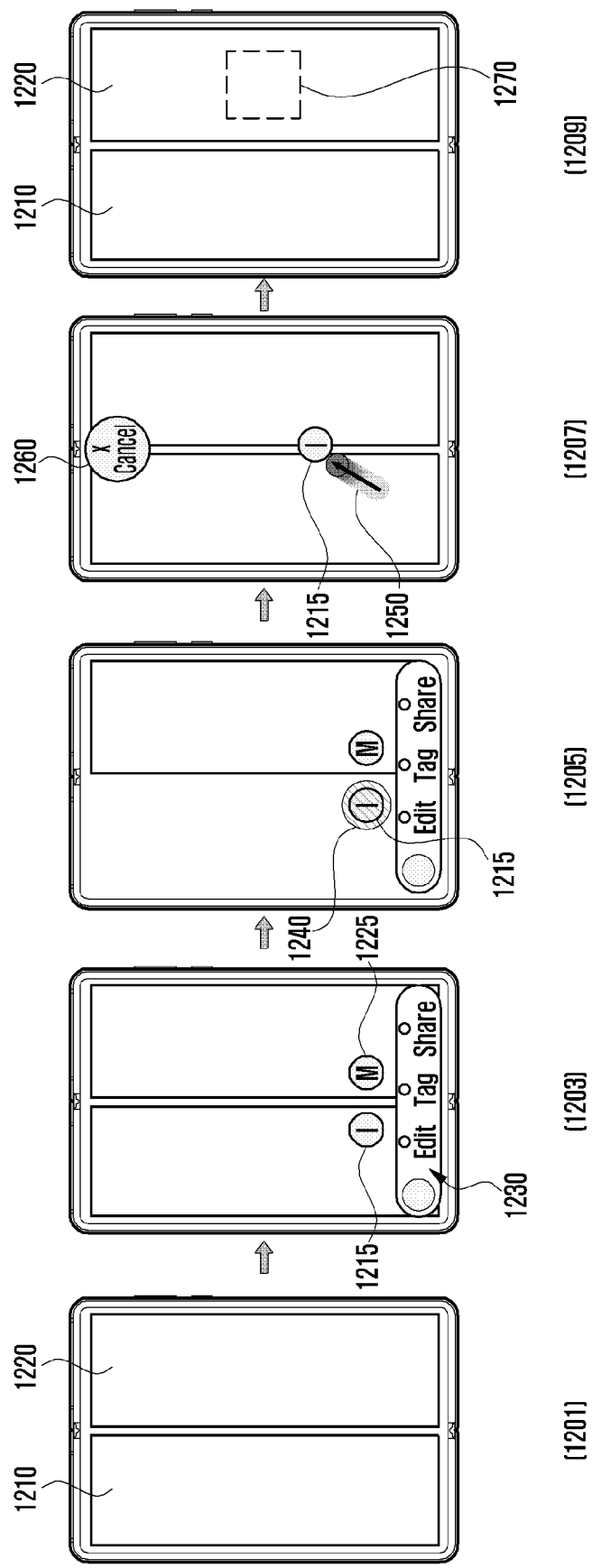
FIG. 12 is a view for explaining an example of operating a screen capture function in a multi-window environment in an electronic device according to an embodiment of the disclosure.

FIG. 12 is a view for explaining an example of operating the screen capture function in a multi-window environment in an electronic device according to an embodiment of the disclosure.

According to the embodiment, FIG. 12 may illustrate an example of the operation of performing and sharing the screen capture in the multi-window environment. According to the embodiment, FIG. 12 illustrates an example of the operation performed in the two-split multi-window environment, but the disclosure is not limited thereto. The operation may be made even in an N-split multi-window environment.

Referring to FIG. 12, in operation 1201, the electronic device 101 may provide an execution screen of an application on the basis of a multi-window including a first window 1210 and a second window 1220. For example, the electronic device 101 displays the first execution screen of the first application (e.g., the Internet application) through the first window 1210 and display the second execution screen of the second application (e.g., message application) through the second window 1220. According to the embodiment, the electronic device 101 may receive the interaction designated to execute the screen capture in the multi-window environment.

In operation 1203, in case that the interaction is received, the electronic device 101 may perform the screen capture. For example, the electronic device 101 performs the screen capture for each of the windows 1210 and 1220 of the multi-window. According to the embodiment, the electronic device 101 may identify the respective regions of interest on the basis of the first execution screen of the first window 1210 and the second execution screen of the second window 1220, perform the screen capture on the basis of the regions of interest, and create and display cue objects 1215 and 1225 on the basis of the capture data respectively corresponding to the regions of interest. For example, the electronic device 101 provides the interest region-based first cue object 1215 of the first execution screen of the first window 1210 and provide the interest region-based second cue object 1225 of the second execution screen of the second window 1220.

According to the embodiment, the electronic device 101 may temporarily store a result of performing the screen capture (e.g., the capture data for each window).

According to the embodiment, when the electronic device 101 provides the cue objects 1215 and 1225, the electronic device 101 may also provide a tool bar 1230 for supporting at least one of the sharing of the edit or capture data related to the capture data (or the region of interest for the capture data). According to the embodiment, the user may select (or designate) any one cue object from the cue objects 1215 and 1225, select an object (or an icon) related to a function (e.g., editing, tagging, and sharing) using the cue object in the tool bar 1230, and execute the corresponding function.

In operation 1205, the user may select (1240) (e.g., tap & hold) the first cue object 1215 from the cue objects 1215 and 1225. According to the embodiment, for example, the cue object may be directly selected (e.g., touched) by the user's hand or the electronic pen or selected by communication between the electronic device 101 and the electronic pen. According to the embodiment, in case that the cue object (e.g., the first cue object 1215) is selected, the electronic device 101 may identify the target capture data related to the selected cue object (e.g., the first cue object 1215), store the target capture data in the memory 130, and remove the temporary capture data related to the non-selected cue object (e.g., the second cue object 1225) from the memory 130.

In operation 1207, the user may move 1250 (e.g., drag & drop) the selected first cue object 1215 to the particular window (e.g., the second window 1220). According to the embodiment, the electronic device 101 may provide a graphic effect in which the displaying of at least one of the tool bar 1230 or the non-selected object (e.g., the second cue object 1225) is removed on the basis of the user input for moving the selected cue object, and the selected first cue object 1215 (or the capture data-based thumbnail image related to the first cue object 1215) is moved by the movement of the user input. According to some embodiments, the electronic device 101 may provide a cancellation object 1260 capable of canceling the movement (e.g., drag & drop) of the cue object on the basis of the user input for moving the selected cue object so that the cancellation object 1260 overlaps (or floats on) one area of the screen (e.g., the upper end of the screen).

According to the embodiment, in case that the user moves (e.g., drag & drop) the selected cue object to the cancellation object 1260, the electronic device 101 may cancel (or stop) the operation of inserting the capture data and display the relevant screen so that the operation is operated again from the operation after the screen capture, for example, as in operation 1203.

In operation 1209, in case that the selected first cue object 1215 is moved (e.g., drag & drop) to the particular window (e.g., the second window 1220), the electronic device 101 may insert the capture data 1270 (e.g., the image) related to the first cue object 1215 into the execution screen (e.g., the second execution screen) of the corresponding particular window (e.g., the second window 1220) and display the capture data 1270.

Figure 13:
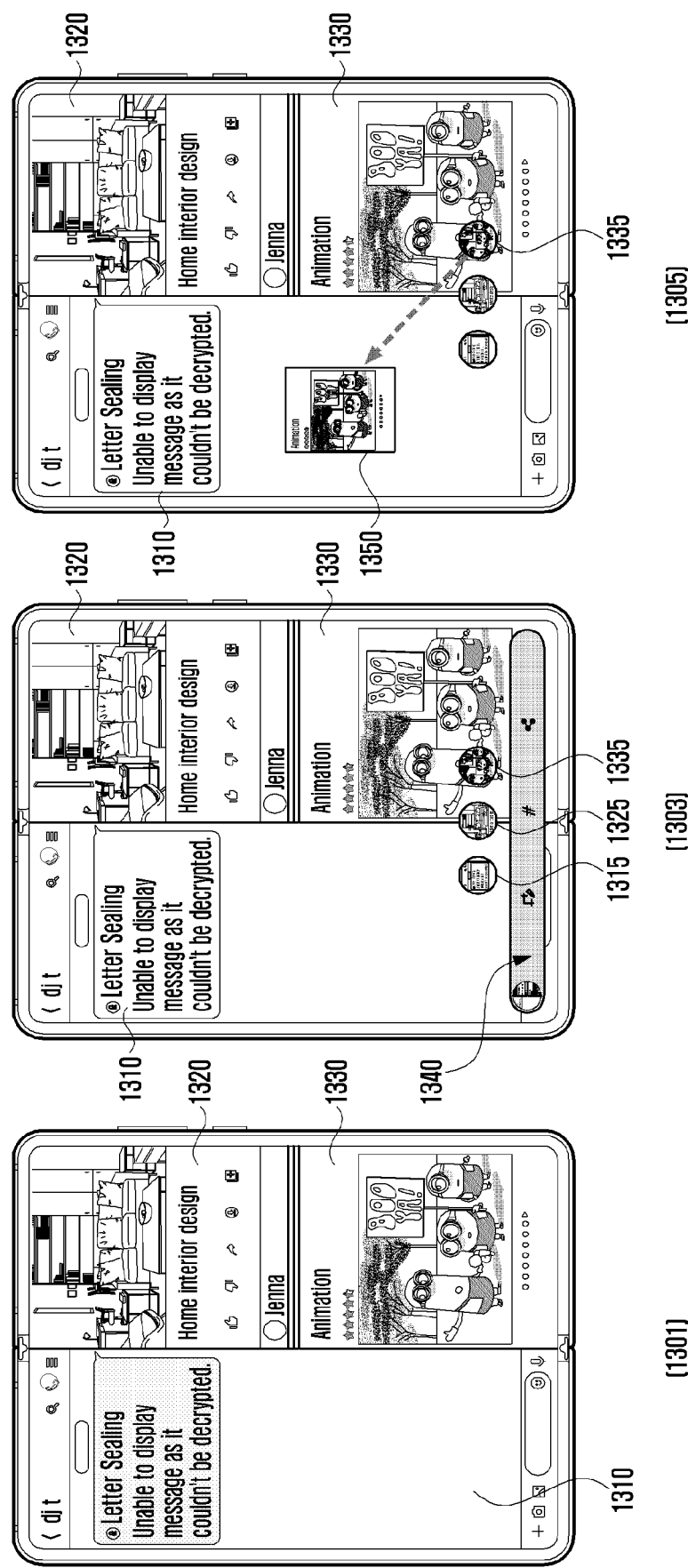
FIG. 13 is a view for explaining an example of operating the screen capture function in a multi-window environment in an electronic device according to an embodiment of the disclosure.

FIG. 13 is a view for explaining an example of operating a screen capture function in a multi-window environment in an electronic device according to an embodiment of the disclosure.

According to the embodiment, FIG. 13 may illustrate an example of the operation of performing and sharing the screen capture in the multi-window environment. According to the embodiment, FIG. 12 illustrates an example of the operation performed in the three-split multi-window environment, but the disclosure is not limited thereto. The operation may be made even in an N-split multi-window environment.

Referring to FIG. 13, in operation 1301, the electronic device 101 may provide an execution screen of an application on the basis of a multi-window including a first window 1310, a second window 1320, and a third window 1330. For example, the electronic device 101 displays the first execution screen of the first application through the first window 1310, display the second execution screen of the second application through the second window 1320, and display the third execution screen of the third application through the third window 1330. According to the embodiment, the electronic device 101 may receive the interaction designated to execute the screen capture in the multi-window environment.

In operation 1303, in case that the interaction is received, the electronic device 101 may perform the screen capture. For example, the electronic device 101 performs the screen capture for each of the windows 1310, 1320, and 1330 of the multi-window. According to the embodiment, the electronic device 101 may identify the respective regions of interest on the basis of the first execution screen of the first window 1310, the second execution screen of the second window 1320, and the third execution screen of the third window 1330, perform the screen capture on the basis of the regions of interest, and create and display cue objects 1315, 1325, and 1335 on the basis of the capture data respectively corresponding to the regions of interest.

For example, the electronic device 101 provides the interest region-based first cue object 1315 of the first execution screen of the first window 1310, the interest region-based second cue object 1325 of the second execution screen of the second window 1320, and the interest region-based third cue object 1335 of the third execution screen of the third window 1330. According to the embodiment, the electronic device 101 may temporarily store a result of performing the screen capture (e.g., the capture data for each window). According to the embodiment, when the electronic device 101 provides the cue objects 1315, 1325, and 1335, the electronic device 101 may also provide a tool bar 1340 for supporting the sharing of the edit and/or capture data related to the capture data (or the region of interest for the capture data).

In operation 1305, the user may select the third cue object 1335 from the cue objects 1315, 1325, and 1335 and move (e.g., drag & drop) the third cue object 1335 to the particular window (e.g., the first window 1310). According to the embodiment, for example, FIG. 13 may illustrate an example in which the displaying state of the cue objects 1315, 1325, and 1335 is maintained until the end of the screen capture operation or the input according to the user's intention.

For example, FIG. 12 may illustrate an example in which the displaying of the other non-selected cue objects is removed, and the corresponding temporary capture data are removed according to the movement of the selected cue object. As another example, FIG. 13 may illustrate an example in which the displaying of the selected cue object and the other non-selected cue object is maintained and the temporary capture data corresponding to the cue objects are maintained when the selected cue object is moved.

According to the embodiment, according to FIG. 13, because the cue objects 1315, 1325, and 1335 are maintained, the user may use the capture data for each window without repeatedly performing the screen capture. For example, the user sequentially inserts all the capture data of the first cue object 1315, the capture data of the second cue object 1325, and the capture data of the third cue object 1335 into the first execution screen of the first window 1310.

According to the embodiment, in case that the cue object is selected, the electronic device 101 may identify the target capture data related to the selected cue object (e.g., the third cue object 1335) and store the target capture data in the memory 130.

According to the embodiment, the electronic device 101 may provide a graphic effect in which the selected third cue object 1335 (or the capture data-based thumbnail image 1350 related to the third cue object 1335) is moved by the movement of the user input on the basis of the user input for moving the selected cue object.

According to the embodiment, in case that the selected first cue object 1215 is moved (e.g., drag & drop) to the particular window (e.g., the first window 1310), the electronic device 101 may insert the capture data (e.g., the image) related to the third cue object 1335 into the execution screen (e.g., the first execution screen) of the corresponding particular window (e.g., the first window 1310) and display the capture data.

Figure 14:
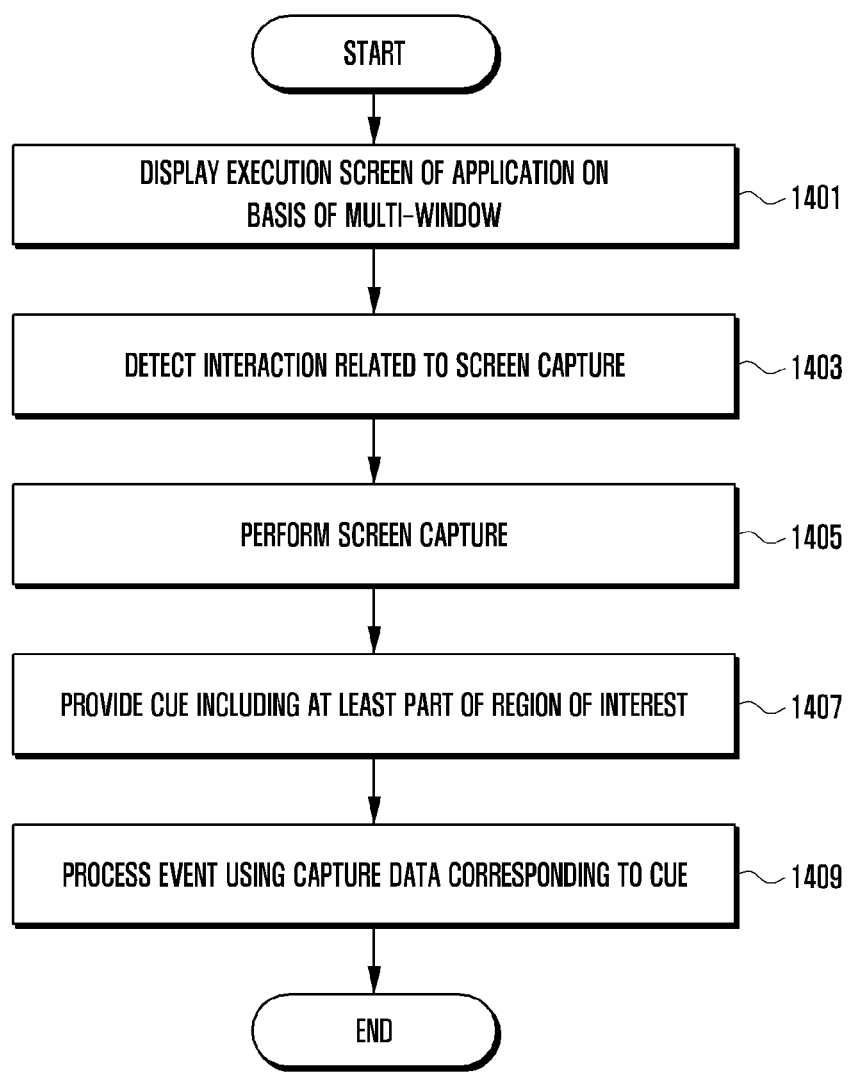
FIG. 14 is a flowchart illustrating an operation of an electronic device according to an embodiment of the disclosure.

FIG. 14 is a flowchart illustrating an operation of the electronic device according to an embodiment of the disclosure.

Referring to FIG. 14, in operation 1401, the processor 120 of the electronic device 101 may display the plurality of execution screens respectively corresponding to the plurality of applications on the basis of the multi-window. According to the embodiment, the processor 120 may provide the multi-window including at least two windows (e.g., the first window, the second window, and the third window) corresponding to the applications that divide and execute the screen of the display module 160 on the basis of the execution of at least two applications. According to the embodiment, the processor 120 may display the execution screens of the applications in each window of the multi-window.

In operation 1403, the processor 120 may detect the interaction related to the screen capture while displaying the respective execution screens through the multi-window. According to the embodiment, the processor 120 may receive the interaction designated to execute the screen capture from the user while displaying the execution screens corresponding to the applications through the multi-window.

In operation 1405, the processor 120 may perform the screen capture for each window on the basis of the region of interest for each window of the multi-window on the basis of the interaction. According to the embodiment, the processor 120 may determine the feature information of the application for each window of the multi-window on the basis of the detection of the interaction and identify (or configure) the region of interest on the basis of the feature information. According to the embodiment, the processor 120 may perform the screen capture on the basis of the respective regions of interest identified on the basis of the first execution screen of the first window and the second execution screen of the second window.

In operation 1407, the processor 120 may provide the cue including at least a part of the region of interest for each window on the basis of the screen capture. According to the embodiment, the processor 120 may create the capture data for each window of the multi-window by capturing the entirety or a part of the region of interest. According to the embodiment, the processor 120 may create and display the cue object for each window on the basis of the capture data. According to the embodiment, the processor 120 may process, at the background, the operation of creating the cue object (e.g., the floating icon) on the basis of the temporarily stored capture data.

In operation 1409, the processor 120 may process the event using the capture data corresponding to the cue on the basis of the user input using the cue. According to the embodiment, the processor 120 may detect an event (e.g., drag & drop) in which the cue is selected by the user and the selected cue moves to a position (or an area) of a particular window of the multi-window. According to the embodiment, the processor 120 may process an event (e.g., drag & drop) operation of inserting the capture data (e.g., the capture data of the first application) corresponding to the selected cue into the execution screen of another application (e.g., the second application) on the basis of the detection of the event.

According to the embodiment, the processor 120 may process the operation of transmitting the capture data (e.g., the capture data of the first application) corresponding to the selected cue to the second application and sharing the capture data with the application of another window.

An operation method performed in the electronic device 101 according to various embodiments of the disclosure may include: an operation of displaying the execution screens respectively corresponding to the plurality of applications on the basis of the multi-window; an operation of detecting the interaction related to the screen capture while displaying the respective execution screens through the multi-window; an operation of performing the screen capture for each window on the basis of the region of interest for each window of the multi-window on the basis of the interaction; an operation of providing the cue including at least a part of the region of interest for each window on the basis of the screen capture; and an operation of processing the event using the capture data corresponding to the cue on the basis of the user input using the cue.

According to various embodiments of the disclosure, the operation of detecting the interaction may include an operation of receiving the interaction designated to execute the screen capture from the user while displaying the plurality of execution screens corresponding to the applications through the multi-window.

According to various embodiments of the disclosure, the designated interaction may include at least one of the capture interaction using the hardware button of the electronic device, the capture interaction using the user's gesture, the capture interaction using voice, the capture interaction using the electronic pen, and/or the capture interaction using the software button of the edge panel.

According to various embodiments of the disclosure, the operation of performing the screen capture may include: an operation of determining the feature information of the application for each window of the multi-window on the basis of the detection of the interaction; an operation of identifying the region of interest on the basis of the feature information; an operation creating the capture data for each window of the multi-window by capturing the entirety or a part of the region of interest; and an operation of temporarily storing the capture data in the memory of the electronic device.

According to various embodiments of the disclosure, the operation of providing the cue may include: an operation of creating the cue object having a designated shape by adjusting the magnitude of the capture data; and an operation of displaying the cue object so that the cue object overlaps at least one execution screen in the designated area in the display module of the electronic device.

According to various embodiments of the disclosure, the operation of processing the event may include: an operation of detecting the event in which the cue is selected by the user and the selected cue is moved to the area of the particular window of the multi-window; and an operation of sharing the capture data corresponding to the selected cue with the application of another window on the basis of the detection of the event.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a display;
   at least one processor operatively connected to the display; and
   memory storing instructions that, when executed by the at least one processor, cause the electronic device to:
      display a plurality of execution screens respectively corresponding to a plurality of applications based on multiple windows,
      detect an interaction related to a screen capture while displaying the plurality of execution screens through the multiple windows,
      based on the detecting of the interaction, perform the screen capture for each window based on a region of interest respectively corresponding to each window of the multiple windows, the region of interest for each window being a partial area of each window automatically emphasized in a designated way based on feature information,
      create a plurality of capture data respectively corresponding to the regions of interest for each window based on the screen capture,
      display a plurality of cue objects respectively corresponding to the plurality of capture data, the plurality of cue objects overlap at least one execution screen adjacent to an edge of the display in an order determined by a configuration of the plurality of execution screens on the display, and
      process an event using capture data corresponding to a cue object based on a user input using the cue object selected from the displayed cue objects.

2. The electronic device of claim 1,
   wherein the instructions, when executed by the at least one processor, cause electronic device to receive an interaction designated to execute the screen capture from a user while displaying the plurality of execution screens corresponding to the plurality of applications through the multiple windows, and
   wherein the designated interaction comprises at least one of:
      a capture interaction using a hardware button of the electronic device, a capture interaction using a user's gesture,
      a capture interaction using voice,
      a capture interaction using an electronic pen, or
      a capture interaction using a software button of an edge panel.

3. The electronic device of claim 1,
   wherein the instructions, when executed by the at least one processor, cause electronic device to:
      determine the feature information of an application for each window of the multiple windows based on the detection of the interaction,
      identify the region of interest based on the feature information,
      create capture data for each window of the multiple windows by capturing an entirety or a part of the region of interest, and
      create and display a cue object for each window based on the capture data, and
   wherein the feature information of the application comprises area information on an area in which at least one of a representative image or a subject is concentrated in an execution screen displayed through the window.

4. The electronic device of claim 3, wherein the instructions, when executed by the at least one processor, cause electronic device to:
   create the cue object having a designated shape by adjusting a magnitude of the capture data.

5. The electronic device of claim 1, wherein the instructions, when executed by the at least one processor, cause electronic device to temporarily store the capture data in the memory.

6. The electronic device of claim 5, wherein the instructions, when executed by the at least one processor, cause electronic device to:
   identify target capture data related to a selected cue object when any one cue object is selected from the displayed cue objects,
   store the target capture data in the memory, and
   remove temporarily stored capture data related to a cue object, which is not selected among the displayed cue objects, from the memory.

7. The electronic device of claim 6, wherein the instructions, when executed by the at least one processor, cause electronic device to display a graphic effect in which a capture data-based thumbnail image related to the selected cue object is moved by a movement of the user input based on the user input that moves the selected cue object.

8. The electronic device of claim 7, wherein the instructions, when executed by the at least one processor, cause electronic device to provide a cancellation object for canceling the movement of the selected cue object.

9. The electronic device of claim 7, wherein the instructions, when executed by the at least one processor, cause electronic device to:
   remove displaying of another cue object, which is not selected by the movement of the selected cue object, and remove corresponding temporary capture data, or
   maintain displaying of the selected cue object and displaying of another non-selected cue object when the selected cue object moves, and maintain temporary capture data corresponding to the displayed cue objects.

10. The electronic device of claim 1, wherein the instructions, when executed by the at least one processor, cause electronic device to provide a tool bar for supporting sharing of at least one of edit or capture data related to the capture data.

11. The electronic device of claim 1, wherein the instructions, when executed by the at least one processor, cause electronic device to:
   detect an event in which the cue object is selected by a user and the selected cue object is moved to an area of a particular window of the multiple windows, and process an operation of sharing the capture data corresponding to the selected cue object with an application of another window based on the detection of the event.

12. A method of operating an electronic device, the method comprising:
   displaying a plurality of execution screens respectively corresponding to a plurality of applications based on multiple windows;
   detecting an interaction related to a screen capture while displaying the plurality of execution screens through the multiple windows;
   based on the detecting of the interaction, performing the screen capture for each window based on a region of interest respectively corresponding to each window of the multiple windows, the region of interest for each window being a partial area of each window automatically emphasized in a designated way based on feature information;
   creating a plurality of capture data respectively corresponding to the regions of interest for each window based on the screen capture;
   displaying a plurality of cue objects respectively corresponding to the plurality of capture data, the plurality of cue objects overlap at least one execution screen adjacent to an edge of the display in an order determined by a configuration of the plurality of execution screens on the display; and
   processing an event using capture data corresponding to a cue object based on a user input using the cue object selected from the displayed cue objects.

13. The method of claim 12,
   wherein the detecting the interaction comprises:
      receiving an interaction designated to execute the screen capture from a user while displaying the plurality of execution screens corresponding to the applications through the multiple windows, and
   wherein the designated interaction comprises at least one of:
      a capture interaction using a hardware button of the electronic device,
      a capture interaction using a user's gesture,
      a capture interaction using voice,
      a capture interaction using an electronic pen, or
      a capture interaction using a software button of an edge panel.

14. The method of claim 12,
   wherein the performing of the screen capture comprises:
      determining the feature information of an application for each window of the multiple windows based on the detection of the interaction;
      identifying the region of interest based on the feature information;
      creating capture data for each window of the multiple windows by capturing an entirety or a part of the region of interest; and
      temporarily storing the capture data in a memory of the electronic device, and
   wherein the feature information of the application comprises area information on an area in which at least one of a representative image or a subject is concentrated in an execution screen displayed through the window.

15. The method of claim 12, wherein the displaying of the plurality of cue objects comprises:
   creating a cue object having a designated shape by adjusting a magnitude of the capture data.

16. The method of claim 15, wherein the cue object is created by downsizing the captured data.

17. The method of claim 16,
   wherein the cue object is a plurality of cue objects, and
   wherein the plurality of cue objects are created and displayed respectively corresponding to a plurality of regions of interest based on the plurality of regions of interest.

18. The method of claim 17, wherein the plurality of cue objects float at any position on the at least one execution screen.

19. The method of claim 12, wherein the processing of the event comprises:
   detecting an event in which the cue object is selected by a user and the selected cue object is moved to an area of a particular window of the multiple windows, and
   processing an operation of sharing the capture data corresponding to the selected cue object with an application of another window based on the detection of the event.

20. A non-transitory computer-readable recording medium storing a program which, when executed, causes an electronic device to perform operations comprising:
   displaying a plurality of execution screens respectively corresponding to a plurality of applications based on multiple windows,
   detecting an interaction related to a screen capture while displaying the plurality of execution screens through the multiple windows,
   based on the detecting of the interaction, performing the screen capture for each window based on a region of interest respectively corresponding to each window of the multiple windows, the region of interest for each window being a partial area of each window automatically emphasized in a designated way based on feature information,
   creating a plurality of capture data respectively corresponding to the regions of interest for each window based on the screen capture,
   displaying a plurality of cue objects respectively corresponding to the plurality of capture data, the plurality of cue objects overlap at least one execution screen adjacent to an edge of the display in an order determined by a configuration of the plurality of execution screens on the display, and
   processing an event using capture data corresponding to a cue object based on a user input using the cue object selected from the displayed cue objects.

21. The electronic device of claim 1, wherein an order of the plurality of cue objects corresponds to an order of windows based on a screen split state of the multiple windows and is arranged in a horizontal or vertical layout according to the order of the windows.

* * * * *